United States Patent
Levinson et al.

(10) Patent No.: US 10,460,290 B2
(45) Date of Patent: Oct. 29, 2019

(54) SYSTEM AND METHOD FOR ESTABLISHING PRESENCE IN A BROKERED CHAT SYSTEM

(75) Inventors: Stuart J. Levinson, Boston, MA (US); Riley W. Crane, Boston, MA (US); Sean Johnson, Chapel Hill, NC (US); Brian F. Buschmann, Fiesole (IT); James M. Byrum, San Francisco, CA (US); Santhosh Balasubramanian, Pasadena, CA (US); Nathan Zorn, Mount Pleasant, SC (US)

(73) Assignee: PATH MOBILE INC PTE. LTD., Singapore (SG)

( * ) Notice: Subject to any disclaimer, the term of this patent is extended or adjusted under 35 U.S.C. 154(b) by 0 days.

(21) Appl. No.: 13/612,090

(22) Filed: Sep. 12, 2012

(65) Prior Publication Data

US 2013/0066988 A1    Mar. 14, 2013

Related U.S. Application Data

(63) Continuation-in-part of application No. 13/557,912, filed on Jul. 25, 2012, now Pat. No. 8,889,157, and a continuation-in-part of application No. 13/557,926, filed on Jul. 25, 2012, now Pat. No. 9,159,053.

(60) Provisional application No. 61/588,568, filed on Jan. 19, 2012, provisional application No. 61/534,141, filed on Sep. 13, 2011, provisional application No. 61/533,517, filed on Sep. 12, 2011.

(51) Int. Cl.
    G06Q 10/10    (2012.01)
(52) U.S. Cl.
    CPC .................... G06Q 10/107 (2013.01)

(58) Field of Classification Search
    CPC .................................................. G06Q 10/107
    See application file for complete search history.

(56) References Cited

U.S. PATENT DOCUMENTS

| | | | |
|---|---|---|---|
| 6,513,013 B1 * | 1/2003 | Stephanou | 705/7.14 |
| 6,901,394 B2 * | 5/2005 | Chauhan et al. | 706/60 |
| 8,099,733 B2 | 1/2012 | Birdwell et al. | |

(Continued)

FOREIGN PATENT DOCUMENTS

| | | |
|---|---|---|
| WO | 2013016432 A1 | 1/2013 |
| WO | 2013/040037 A1 | 3/2013 |

OTHER PUBLICATIONS

Notification and Transmittal of the International Search Report and the Written Opinion of the International Searching Authority, or the Declaration for International Application No. PCT/US2012/48155, dated Sep. 27, 2012, 16 pages.

(Continued)

*Primary Examiner* — Robert W Beausoliel, Jr.
*Assistant Examiner* — Hau Hoang
(74) *Attorney, Agent, or Firm* — Cantor Colburn LLP

(57) ABSTRACT

Systems and methods for determining status of a user in a brokered chat service are disclosed. In one example, the method comprises acts of receiving, via the brokered chat service, a check-in message from the user, establishing the status of the user as available in the brokered chat service, transmitting at least one message to the user via the brokered chat service in response to establishing the status of the user as available, and updating the status of the user in the brokered chat service in response to communication from the user.

28 Claims, 11 Drawing Sheets

(56) References Cited

U.S. PATENT DOCUMENTS

| | | |
|---|---|---|
| 8,650,283 B1 | 2/2014 | Chang et al. |
| 2001/0047270 A1 | 11/2001 | Gusick et al. |
| 2002/0026483 A1* | 2/2002 | Isaacs et al. .................. 709/206 |
| 2002/0083127 A1* | 6/2002 | Agrawal ....................... 709/203 |
| 2003/0097448 A1 | 5/2003 | Menezes et al. |
| 2004/0218749 A1* | 11/2004 | Shaffer et al. ........... 379/265.02 |
| 2005/0021378 A1 | 1/2005 | Weinstock et al. |
| 2005/0086290 A1 | 4/2005 | Joyce et al. |
| 2005/0119957 A1* | 6/2005 | Faber et al. .................... 705/35 |
| 2006/0262922 A1 | 11/2006 | Margulies et al. |
| 2007/0192415 A1 | 8/2007 | Pak |
| 2008/0082620 A1* | 4/2008 | Barsness ....................... 709/207 |
| 2008/0147741 A1* | 6/2008 | Gonen et al. .............. 707/104.1 |
| 2009/0319544 A1 | 12/2009 | Griffin et al. |
| 2010/0058234 A1* | 3/2010 | Salame et al. ................. 715/810 |
| 2010/0076837 A1* | 3/2010 | Hayes et al. ............... 705/14.41 |
| 2010/0138402 A1 | 6/2010 | Burroughs et al. |
| 2010/0174709 A1 | 7/2010 | Hansen et al. |
| 2010/0198645 A1 | 8/2010 | Heiss et al. |
| 2010/0268776 A1 | 10/2010 | Gerke |
| 2011/0119258 A1 | 5/2011 | Forutanpour et al. |
| 2011/0158209 A1* | 6/2011 | Lundsgaard et al. ......... 370/338 |
| 2012/0030232 A1 | 2/2012 | John et al. |
| 2012/0036148 A1 | 2/2012 | Jain et al. |
| 2012/0084283 A1 | 4/2012 | Chitiveli et al. |
| 2012/0158687 A1 | 6/2012 | Fang et al. |
| 2012/0253944 A1 | 10/2012 | Reese |
| 2012/0296891 A1 | 11/2012 | Rangan |
| 2013/0006698 A1 | 1/2013 | Roy et al. |
| 2013/0054588 A1 | 2/2013 | Levinson et al. |
| 2013/0054716 A1 | 2/2013 | Levinson et al. |
| 2013/0066988 A1 | 3/2013 | Levinson et al. |

OTHER PUBLICATIONS

Notification of Transmittal of the International Search Report and the Written Opinion of the International Searching Authority, or the Declaration for International Application No. PCT/US2012/54867, dated Nov. 23, 2012, 7 pages.

"WLAN Channel Selection without Communication"—Leith et al., Hamilton Institute, National University of Ireland, Jun. 2009; http://www.hamilton.ie/net/ToN-colouring_peter.pdf.

\* cited by examiner

SYSTEM AND METHOD FOR ESTABLISHING PRESENCE IN A BROKERED CHAT SYSTEM

RELATED APPLICATIONS

This application claims priority under 35 U.S.C. § 119(e) to U.S. Provisional Application Ser. No. 61/533,517, entitled "SYSTEM AND METHOD FOR ESTABLISHING PRESENCE IN A BROKERED CHAT SYSTEM," filed on Sep. 12, 2011, U.S. Provisional Application Ser. No. 61/534,141 entitled "MULTI-USER COMMUNICATION SYSTEM AND METHOD," filed on Sep. 13, 2011, and U.S. to Provisional Application Ser. No. 61/588,568, entitled "SYSTEMS AND METHODS FOR PERSON TO ORGANIZATION CHAT FEDERATION," filed on Jan. 19, 2012, which are hereby incorporated herein by reference in their entirety.

This application claims the benefit under 35 U.S.C. § 120 of U.S. application Ser. No. 13/557,926, entitled "SYSTEM AND METHOD FOR ABSTRACT COMMUNICATION," filed on Jul. 25, 2012, and U.S. application Ser. No. 13/557,912, entitled "SYSTEMS AND METHODS FOR PROVIDING SEARCH RELEVANCY IN COMMUNICATION INITIATION SEARCHES," filed on Jul. 25, 2012, which are herein incorporated by reference in their entirety.

BACKGROUND

1. Applicable Field

The field of the present invention relates generally to systems and methods for communicating with businesses, organizations or other entities.

2. Related Art

People may seek to personally communicate with businesses, organizations or other entities for various reasons. A person may wish, for example, to provide feedback, address customer service issues, make reservations, inquire about products or services, or find information not available through other methods. There are many communication options available, for example, calling or sending an email to a local business, calling or sending an email to a corporate office or initiating a web-chat on the entity's website.

Typically, the person performs a search using a search engine in an attempt to initiate communication with the entity. The person usually searches for an implicit or explicit communication token, such as a phone number, an email address, or a Web contact form, that can be used to initiate communication with the entity. These tokens for any type of entity can be found on the entity's Web page (typically by following a "Contact" link). These tokens can also be found on place pages (specific type of Web page that describes a specific addressable geographic location), or using various service websites (review websites) or applications.

SUMMARY

It is appreciated that some customers find text-based communications with various business entities, for example email or web-chat systems, more convenient than making a phone call. Text-based communication may be preferred in noisy environments, where an audio conversation may be difficult or where conversations can be overheard by others. Text-based communication does not tie up phone lines and may allow for multi-tasking and interruptions. For these reasons, there is demand for businesses and organizations to provide text-based forms of communication.

Businesses, organizations and other entities may also prefer to channel customer service requests to text-based forms of communication to quickly and cheaply address any questions or concerns. But customers often find that text-based forms of communication with businesses, organizations and other entities can be inconsistent. For instance, response times to email inquiries can depend on the nature of the inquiry, the size of the entity, and whether the entity has a dedicated customer service team. Different chat solutions exist for each business or organization with each chat solution having its own nomenclature, keyboard and mouse commands, look and feel, way of behaving, and software system requirements.

It is appreciated that even with all these communication options there is a communication gap between people attempting to initiation communication with an entity and the entities supplying the response. For example, if a person wants to contact a local branch of a chain store to find out if the store carries a specific brand of shoe in his or her size, the person would have to go to the store's website or search for the store in a search engine. After finding the local store's phone number, the person may call the store and ask an employee of the store to check inventory for that shoe. If the local store does not have the shoe in stock, the person would have to find and call the next store and repeat the process. Instead, the person may email corporate customer service and wait for a response, which may not come for a few days, or if one exists, initiate a web-chat with the corporate customer service after locating a chat link through a series of navigations of the store's website.

These extra communication steps form the communication gap that can be time-consuming and frustrating for the person. Some solutions to this communication gap include web-chat systems provided by businesses on their websites. These web-chat systems allow a person visiting a business or organization's web site to initiate and conduct an online chat discussion with a representative of the business. In these web chat systems, the visitor initiates a chat and is then able to chat with a single available representative of the business.

A common feature of web-chat systems determines user's presence in the web-chat system. The feature may allow other users to know whether a particular user of the chat system is present and available to receive messages. In many cases, the shared communication network over which communication takes place is based on long-lived network sockets over a TCP/IP network. Determination of presence in the long-lived communication network is based on the open or closed nature of the connection socket. It is often desirable to allow users of networks and protocols other than long-lived network sockets to establish presence or to determine presence of other users. However, characteristics of typical brokered networks do not allow typical methods of establishing presence to be used.

Accordingly, there is a need for systems and methods for connecting individuals with businesses, organizations and other entities that allow the individuals to obtain information quickly and without the extra communication steps. Aspects and examples disclosed herein are directed to a system and method of providing a communication service that bridges the gap between the individual users and the entities and offers a single, universal communication solution.

Underlying at least some of these systems is the premise that for every person, place, object, company, brand, organization, or other entity, there is an underlying human who can speak for the entity in question. In this system for abstract communication, the user has the ability to identify the desired communication entity and reach the human that can speak on behalf of that entity. Examples, though by no means exhaustive, include communicating with the officer representing a national park, an employee representing a corporation, an employee representing a corporation's product, a worker representing a political campaign, a repairmen representing maintenance, a farmer representing a bottle of wine, or a fisherman representing a catch.

According to various embodiments, a communication service is provided that allows for the entity to utilize its existing pool of employees and representatives to communicate on its behalf. Example interfaces described herein further allow for any representative or agent of the entity to answer incoming messages by the users. Furthermore, such interfaces may allow for the agents to respond to inquiries from anywhere using a mobile device. According to various embodiments, such systems and methods streamline communications between individuals and organizations and allow for seamless transfer of information from the organization to the individual.

In addition, various systems and methods described herein provide for representatives of the entity to establish presence in the communication service without use of a long-lived communication sockets. An indication of entity presence can displayed to the user when the user is searching for entities provided via the communication service. Using this indication, the user searching for entities can determine whether the entity can be reached at the present moment. In addition, the communication service can also rank search results based on whether the entity is present and available to answer user's inquires.

At least some of the methods and systems described herein allow users to send inquiries to various entities via the communication service without first searching for contact information or having any prior contact with the entity.

According to one embodiment, a method for enabling communication between a user and at least one entity by a communication service is disclosed. In one example, the method comprising acts of receiving a search for the at least one entity, analyzing the search, by a processor, to determine search results based on the search including the at least one entity, receiving a message from the user to the at least one entity, the message including inquiry information directed to the at least one entity, determining, by the processor, presence status associated with the at least one entity, establishing, by the processor, a communication channel between the user and the at least one entity based on the presence status, and transmitting a response to the message based on the inquiry information via the communication channel.

In another example, the method further comprises determining whether presence status of the at least one entity is established as being online and establishing the communication channel further comprising establishing a chat session between the user and the at least one entity. In addition, the method may further comprise transmitting the message to at least one agent of the at least one entity via an entity interface, receiving the response to the message from the at least one agent, and transmitting the response to the message to the user via the chat session.

In one example, the method further comprises receiving from the at least one entity an input defining at least one communication channel via an entity interface and transmitting the message to the at least one entity via the at least one communication channel. In addition, the method may further comprise establishing the at least one entity as offline, determining the at least one communication channel defined by the at least one entity, transmitting the message to the determined at least one communication channel, and receiving the response from the entity via the at least one communication channel.

In another example, the method comprises establishing the at least one entity as offline, transmitting the message to a call center, and receiving the response from the call center on behalf of the entity. In yet another example, the method comprises establishing the at least one entity as offline, generating the response based on information associated with the at least one entity, and transmitting the generated response to the user.

In some examples, the method comprises displaying the response received from the at least one entity within the chat session, via a personal interface on a device associated with the user, on behalf of the at least one entity.

According to another embodiment, a system for enabling communication between a user and at least one entity in a distributed communication network is disclosed. In one example, the system comprises an interface configured to receive a search for the at least one entity and receive a message from the user to the at least one entity, the message including inquiry information directed to the at least one entity, a processor configured to analyze the search to determine search results based on the search including at least one entity, determine a presence status associated with the at least one entity included in the search results, establish a communication channel between the user and the at least one entity based on the presence status, wherein the interface is configured to transmit a response to the message based on the inquiry information via the communication channel.

In another example, the processor is further configured to determine whether presence status of the at least one entity is established as online and establishing a chat session between the user and the at least one entity. In some examples, the interface is further configured to transmit the message to at least one agent of the at least one entity via an entity interface and receive the response to the message from the at least one agent, wherein the entity interface is configured to display the message and the response via the chat session.

In one example, the interface is further configured to receive from the at least one entity an input defining at least one communication channel via an entity interface and transmitting the message to the at least one entity via the at least one communication channel. In another example, the processor is further configured to establish the at least one entity as offline and determine the at least one communication channel defined by the at least one entity, and wherein the interface is further configured to transmit the message to the determined at least one communication channel, and receiving the response from the entity via the at least one communication channel.

In some examples, the processor is further configured to establish the at least one entity as offline, wherein the interface is further configured to transmit the message to a call center and receive the response from the call center on behalf of the entity. In addition, the processor may be further configured to establish the at least one entity as offline, and generate the response based on information associated with the at least one entity, and the interface is further configured to transmit the generated response to the user.

In another example, the processor is further configured to transmit the response via a personal interface on a device associated with the user, on behalf of the at least one entity, wherein the personal interface is configured to display the message and the response to the user.

According to another embodiment, a non-transitory computer readable medium for enabling communication between a user and at least one entity in a distributed communication network is disclosed. In one example, the non-transitory computer readable medium having stored thereon sequences of instruction that are capable of causing at least one processor to receive a search for the at least one entity and receive a message from the user to the at least one entity, the message including inquiry information directed to the at least one entity, analyze the search to determine search results based on the search including at least one entity, determine a presence status associated with the at least one entity included in the search results, establish a communication channel between the user and the at least one entity based on the presence status, and transmit a response to the message based on the inquiry information via the communication channel.

According to another embodiment, a method for determining status of a user in a brokered chat service is disclosed. In one example, the method comprises acts of receiving, via the brokered chat service, a check-in message from the user, establishing the status of the user as available in the brokered chat service, transmitting at least one message to the user via the brokered chat service in response to establishing the status of the user as available, and updating the status of the user in the brokered chat service in response to communication from the user.

In another example, updating the status of the user further comprises receiving a check-out message from the user, via the brokered chat service. In one example, the method further comprises establishing the status of the user as unavailable in response to receiving the check-out message. In another example, the method further comprises suspending transmission of the at least one message to the user.

In some examples, updating the status of the user further comprises determining whether the at least one message is received from the user via the brokered chat service. In at least one example, the method further comprises further comprising transmitting via the brokered chat service an inquiry message to the user in response to determining whether the at least one message is received.

In another example, the method further comprises establishing the status of the user as unavailable in response to failing to receive a response to the inquiry message. In one example, the method further comprises suspending transmission of the at least one message in response to establishing the status of the user as unavailable. In at least one example, the method further comprises receiving a response to the inquiry message from the user and updating the status of the user as available as a result of receiving a response to the inquiry message. In another example, the method further comprises displaying the status of the user in the brokered chat service.

According to another embodiment, a brokered chat system is disclosed. In one example, the brokered chat system comprises a receiving gateway configured to receive at least one message from a first user via a first device, the first user is included in a plurality of users, a transmitting gateway configured to transmit the at least one message from the first user to a second user via a second device, the second user is included in the plurality of users and the first device and the second device are included in a plurality of devices, a processor, configured to determine status for the plurality of users in the brokered chat system by: receiving a check-in message from one user of the plurality of users, establishing the status of the one user as available to receive the at least one message, transmitting the at least one message to the one user in response to establishing the status of the one user as available, and updating the status of the one user in the brokered chat service in the brokered chat system.

In another example, the processor is further configured to receive a check-out message from one user of the plurality of users via one of the plurality of devices. In at least one example, the processor is further configured to establish the status of the one user as unavailable in response to receiving the check-out message and transmit the status of the one user to the plurality of devices. In some examples, the transmitting gateway is further configured to suspend transmission of the at least one message to the one user in response to receiving the check out message.

In another example, the processor is further configured to determine whether the at least one message is received from the one user of the plurality of users via the receiving gateway. In one example, the processor is further configured to transmit via the transmitting gateway an inquiry message to the one user in response to determining whether the at least one message is received. In some examples, the processor is further configured to establish the status of the one user as unavailable in response to failing to receive a response to the inquiry message and to transmit the status of the one user to the plurality of devices. In at least one example, the processor is further configured to suspend transmission of the at least one message to the one user in response to establishing the status of the one user as unavailable.

In other examples, the receiving gateway is further configured to receive a response to the inquiry message from the one user and the processor is further configured to update the status of the one user as available as a result of receiving the response to the inquiry message and to transmit the status of the one user to the plurality of devices.

In at least one example, the processor is further configured to determine first protocol information for the first device and second protocol information for the second device, and configure the at least one message from the first device based on the second protocol information for the second device.

According to another embodiment, a non-transitory computer readable medium for determining status of a user in a brokered chat service is disclosed. In one example, the non-transitory computer readable medium may include having stored thereon sequences of instruction that are capable of causing at least one processor to receive, via the brokered chat service, a check-in message from the user, establish the status of the user as available in the brokered chat service, transmit at least one message to the user via the brokered chat service in response to establishing the status of the user as available, and update the status of the user in the brokered chat service in response to communication from the user.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
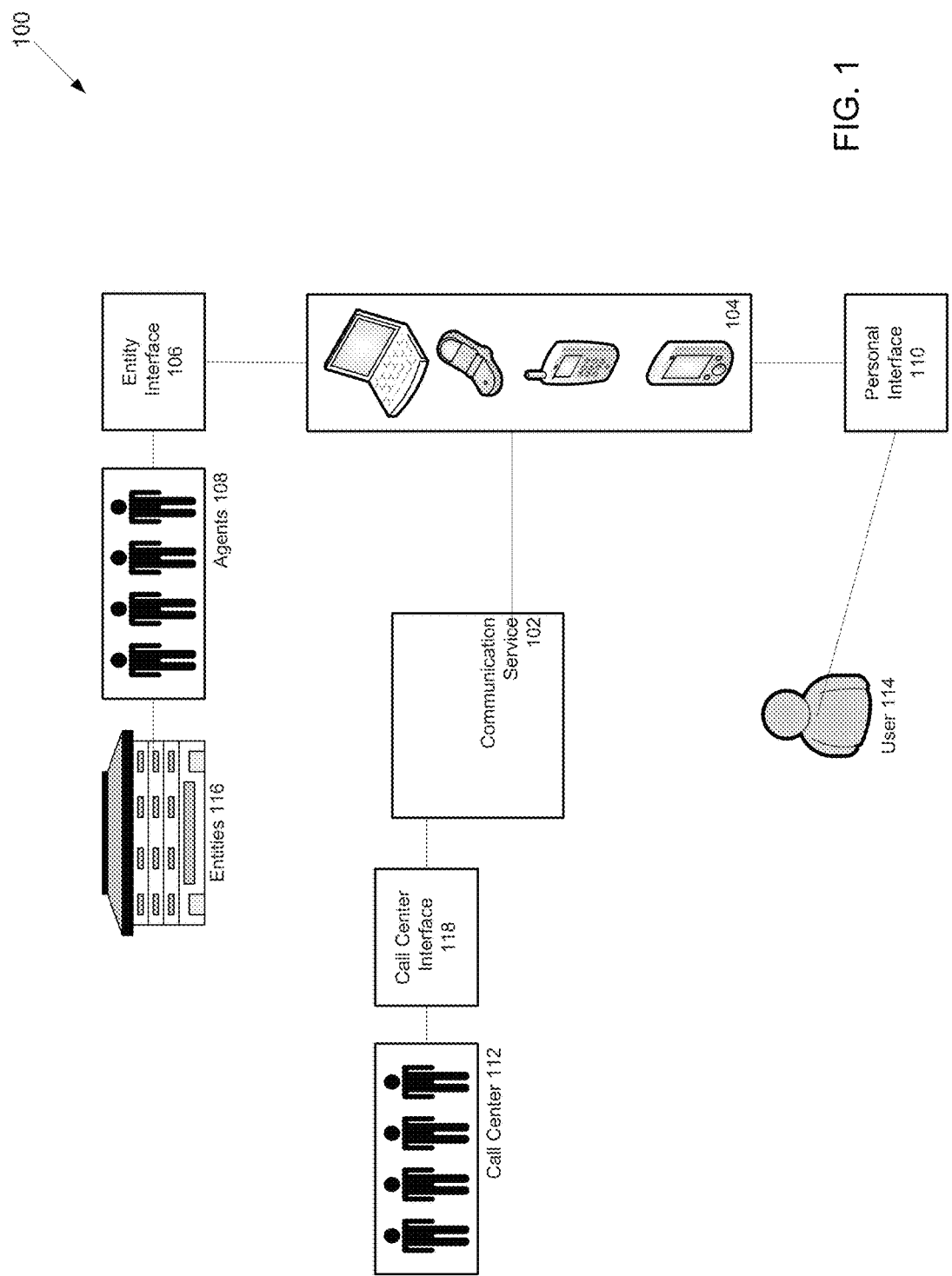
FIG. 1 is a block diagram of one example of a distributed communication system, according to one embodiment.

As described above, currently existing communication options do not offer seamless communication desired by the user, necessitating additional steps or discrete, proprietary interfaces. Accordingly, there is a need for systems and methods that bridge the communication gap and make the additional steps or the proprietary interfaces transparent to the user. Aspects and examples disclosed herein relate to systems and methods for a communication service, which along with personal and entity interfaces, allow individual users to communicate with entities.

In addition, the embodiments disclosed herein include systems and methods that determine user presence in a brokered chat system. The systems and methods according to some examples include a presence service that allows a user to establish presence in the brokered chat system. The presence service can be part of a brokered chat service and that serves as a chat broker between the systems using different chat systems and protocols. Embodiments described herein, may establish the brokered user's presence in the chat network without cost or overhead or disruption experienced by the user.

The entities can include products, businesses, nonprofit and for-profit organizations, government organizations, educational organizations, groups or professional organizations, and members of political organization such as senators and congressmen, and among other entities or groups. The communications to the entities may include a call to action on the part of the entity, such as, issuing a refund or returning an item, purchasing tickets, holding an item, reserving a table, or making an appointment. The communications may also be passive information on a particular topic or regarding a particular item (e.g. feedback). The communications can also include background information regarding the user, user specific circumstances, or past history.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows a distributed communication system 100 including a communication service 102 for managing and enabling communication of information between individuals and various entities. The distributed system can include the communication service 102, devices 104, an entity interface 106, agents 108, users 114, a personal interface 110, a call center 112 and a call center interface 118. In one example, the communication service 102 allows the users 114 to quickly communicate and obtain information from one or more entities 116.

According to various examples, one or more components of the distributed communication system 100 can be implemented using one or more computer systems, such as the distributed computer system 900 discussed below with regard to FIG. 9. Thus, examples of the distributed communication system 100 include a variety of hardware and software components configured to perform the functions described herein and examples are not limited to a particular hardware component, software component or a particular combination thereof.

For instance, the user 114 may provide one or more inputs to one of the devices 104, such as a cell phone, a smart phone, a PDA, a tablet computer, a laptop computer, a desktop computer or another system. Users 114 may interact with the devices 104 using the personal user interface 110, which may be provided on the devices. The personal user interface 110 may allow for inputs using keyword searches, geographical map searches and inputs, location based searching (e.g., within 2 mile radius of the present location), category selections (such as "restaurants"), and other methods of inputting search parameters. The searches are transmitted to the communication service 102, which may return search results comprising of one or more entities meeting the search criteria.

Figure 2B:
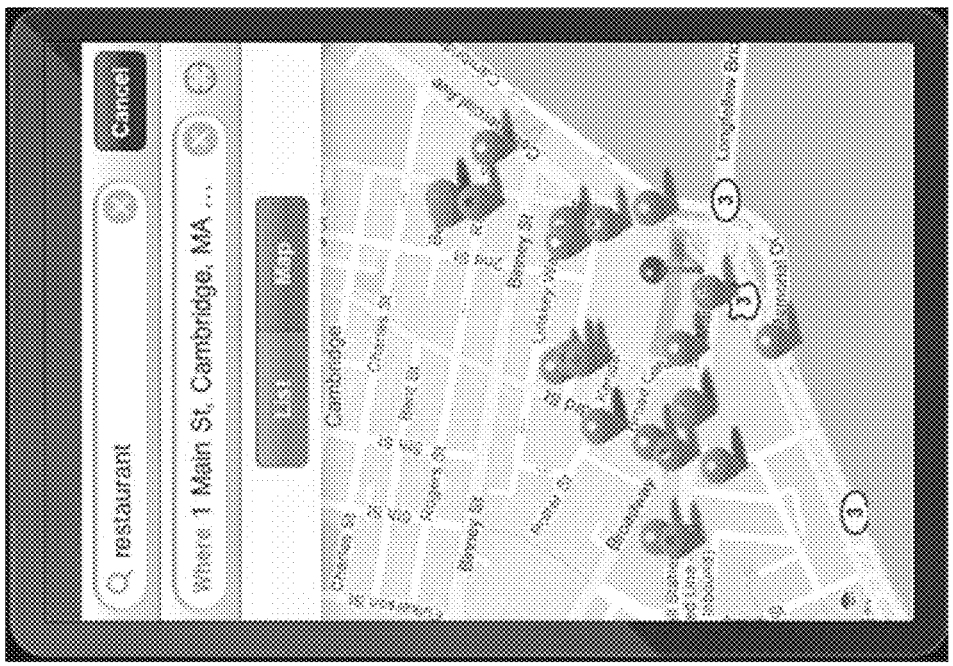
FIG. 2B is a diagram of one example of a personal interface according to another embodiment.
Figure 2A:
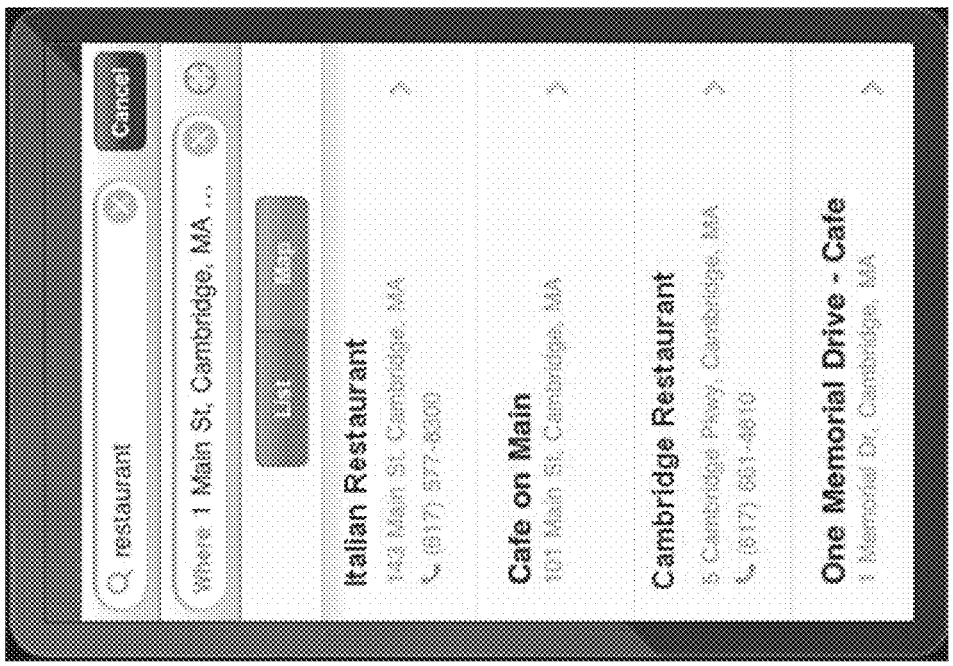
FIG. 2A is a diagram of one example of a personal interface according to one embodiment.

FIG. 2A shows one example of the personal interface 110 with a search performed by a user for a restaurant near the address of the user's current location (i.e. Cambridge, Mass.). The returned results may be displayed to the user as a list of restaurants, with address and constant information. The search results may also be displayed on a map displaying the user's current location and the locations of the search results (FIG. 2B). The user may switch between the two display modes.

Figure 2D:
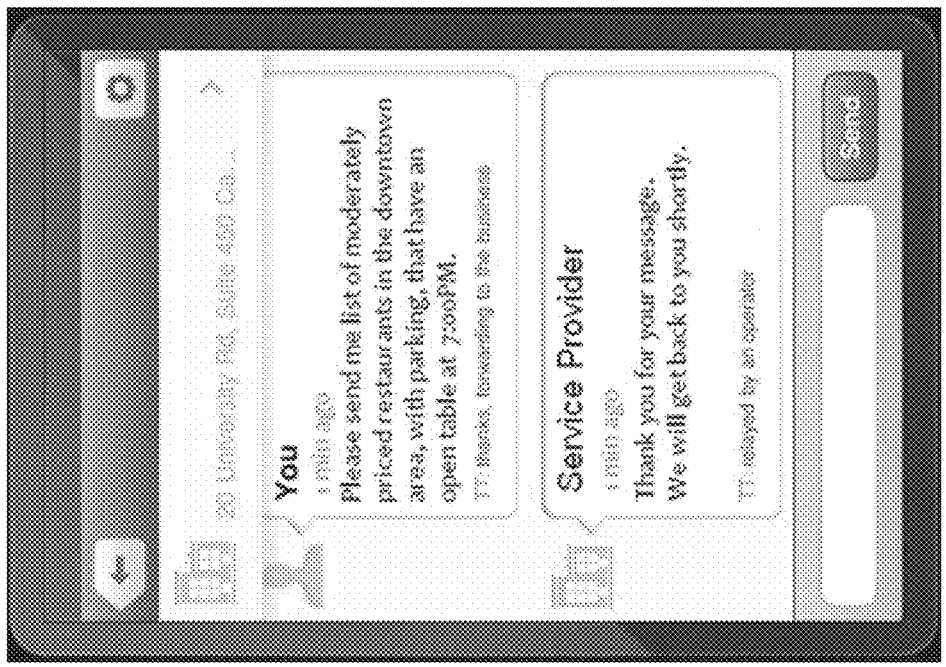
FIG. 2D is a diagram of one example of a personal interface according to another embodiment.
Figure 2C:
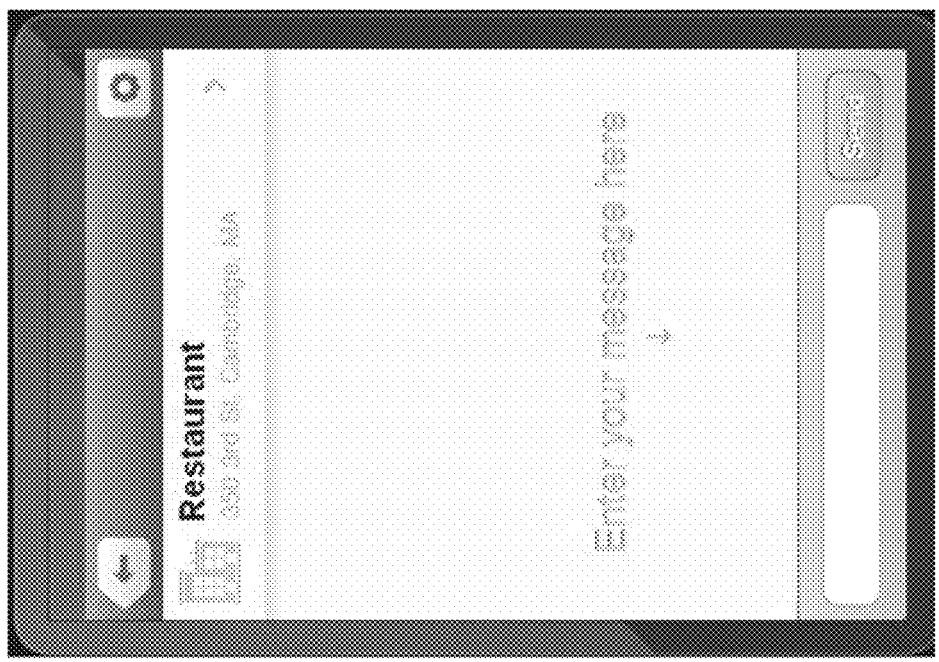
FIG. 2C is a diagram of one example of a personal interface according to another embodiment.

The user 114 can select one or more entities and input a message to one or more of the entities from the returned search list. The message can be one or many words or sentences and may include additional attachments such as images, videos, emails, or other attachment types. Virtually any information can be transmitted as part of the message. In another example, the same message can be sent to multiple entities. For example, the user can send a message to four jewelers located within a five radius of the user inquiring whether the jewelers can repair a particular watch brand. FIG. 2C shows one example of the personal interface 110 with a message field that may allow the user to enter a message to "Restaurant" presented as part of the search results.

In another example, the user 114 does not input search parameters and instead inputs the message into the message field directly. In this fashion, the user 114 can input a general inquiry or an inquiry in a particular category in the context of the message. For example, as shown in FIG. 2D, the user can input a message to the service requesting a list of moderately restaurants in the downtown area, with parking, with an open table at 7:00 PM. In another example, the message can let the parks department know that a particular tree in the park has termite damage.

In another example, the message is targeted to a particular individual. For instance, the message inquires about a particular state senator's position on a political issue or legislation of concern to the user. The message can also inquire or request information about a product without first locating manufacturer information. For instance, the user 114 may wish to communicate feedback regarding a defective home appliance and may reference a product name and a model number in the message.

The messages can then be transmitted to the communication service 102. The communication service 102 can generate a multi-user chat session between the communicating user and the entity as further described below. According to some examples, if the entity the user is attempting to contact is not available to respond, the communication service can take one or more steps to obtain a response to the message. The communication service 102 can receive the responses from the entities or from the call center and transmit the responses to the user to be displayed in the chat session via the to personal interface 110.

Communications within the distributed communication network, including any messages, requests and inquires can be transmitted or formatted to any format acceptable by the target system, for example, communications between the devices 104 via the personal interface and the communication service 102, communications between the devices 104 via the entity interface 106 and the communication service 102, as well as communications between the call center interface and the communication service 102. In various examples the format may include HTML, plain text emails, SMS messages, MMS messages, IM messages, audio messages, VOIP messages, plain text messages, any propriety format, among other communication standards.

Figure 2E:
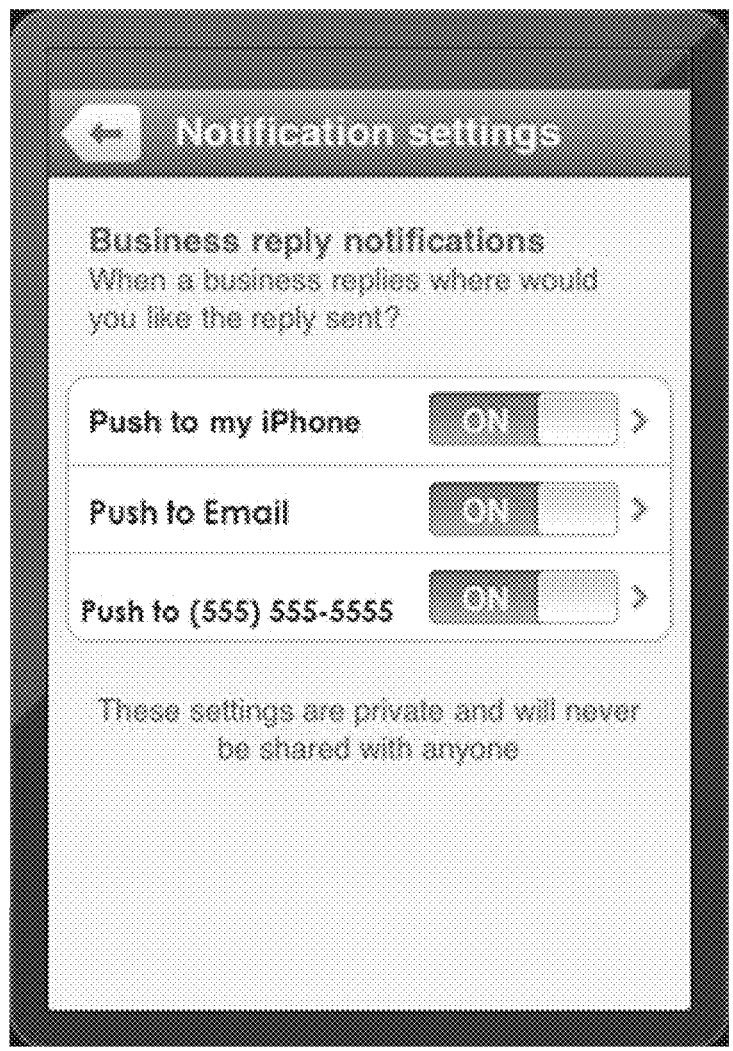
FIG. 2E is a diagram of one example of a personal interface according to another embodiment.

The user, via the personal interface 110, may further register and configure communication channels comprising one or more devices utilized by the user. As shown in FIG. 2E, the user can register and select which devices can receive responses from entities, for example by switching registered devices "on" or "off." The user may be configured to receive responses through one or more devices at the same time and can further configure these preference settings from any of the devices available to the user.

In some examples, the device 204 may not support a graphical interface. In this instance, the communication to and from the user can be received and transmitted via a messaging application supported by the device, for example SMS text or email messaging application. In one example, the user can register the device with the communication service to provide user communications through that specific device using the messaging application supported by the device. For example, by registering the user's mobile phone, the communication service can send SMS text messages to the user's mobile phone every time a response from the entity is send to the user. In this example, the user can view the SMS text message in the SMS application available on the user's phone.

The personal interface 110 can also include a method of providing a common input form that is agnostic to underlying transactional systems and eliminate disparate forms used by different entities. Any information typically requested from the user, as a predefined set of prompts may be included in the structured information. Structured information can include, for example, tracking information, appointment information, reservation information, taxi dispatch information and any other information. For example, if the user is interested in requesting a taxi, the structured information can to include, date, time, starting location, destination location, contact name and number for the person, type of taxi, and the number of passengers.

The method of providing the common input form can include a way to enter the structured information via the personal interface 110. In one example, the personal interface 110 can request the needed information from the user, for example in the form of a series of leading questions communicated to the user. In another example, the method may auto-fill the structured form information from the information stored in the device or any other location that may store the structured information, for example, user location, name or contact number. If any structured form information is missing from the user input, a follow-up request can prompt the user to enter the missing structured form information. It should be appreciated that any method of obtaining information can be used to obtain the structured information. In one example, the structured form information received by the communication service can be provided to another service, such as a restaurant reservation service. In another example, the structured form information can be provided directly to the entity using any of the entity's provided communication channels.

Figure 3:
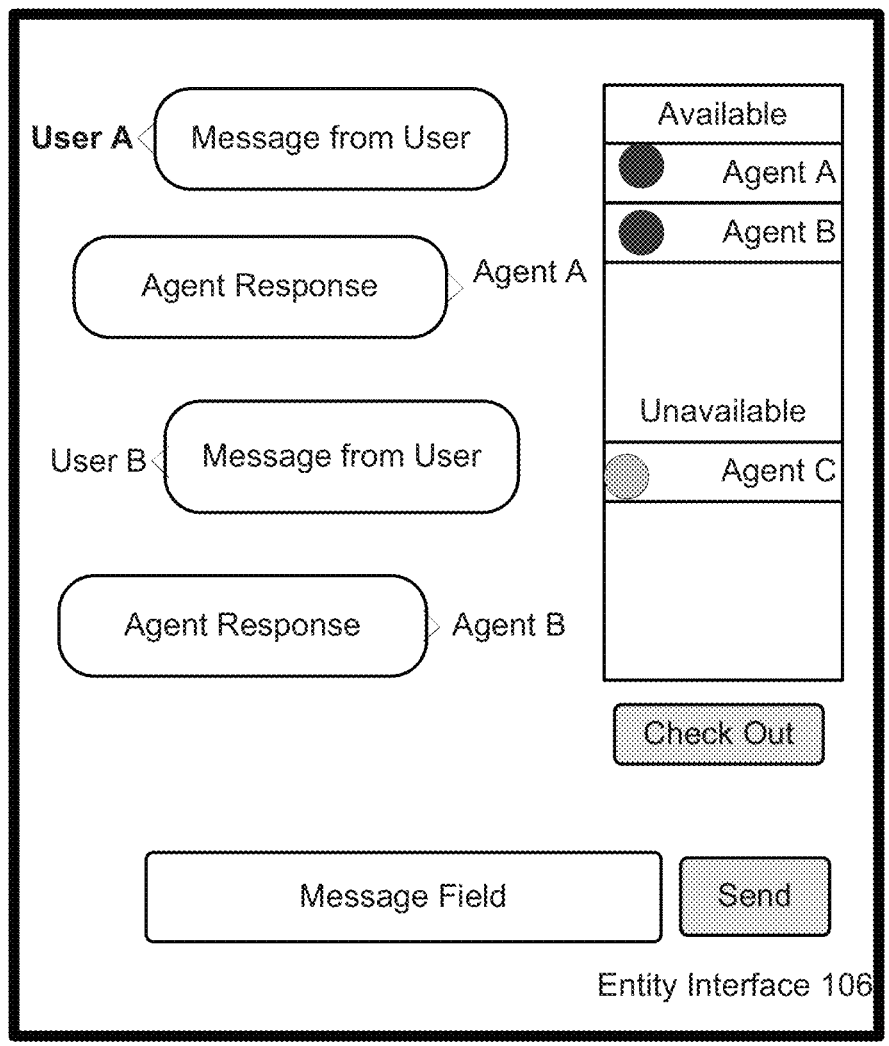
FIG. 3 is a block diagram of one example of an entity interface according to another embodiment.

FIG. 3 shows an example of the entity interface 106 according to various aspects of the present invention. In one example, the communication service 102, via the entity interface 106, allows the entities to seamlessly communicate with the users 114 as single virtual entities while multiple people or agents communicate on the entity's behalf. The agents may be employees of the entity, independent contractors, third party employees, or individual users with authority to speak for the entity. Agents 108 can communicate with the users 114 through via the entity interface 106 on the devices 104. If the device 104 is a mobile device, agents 108 can respond to messages and requests as part of their other duties and do not need to use a dedicated computer system. For example, the agents 108 can be sales representatives in a store that can perform other duties, such as managing the sales floor.

To enable seamless communication with the user, the communication service 102 may generate multi-user chat sessions between the user and the agents 108. According to one embodiment, based on the communication sent from a respective user directed to an entity, via the personal interface 110, the communication service 102 can generate a chat session between the entity and the user. In one example, any new or subsequent message from the same user to the same entity may be displayed in the chat session between the user and the entity. The chat session generated between the user and the entity allows for multi-user communications. In various embodiments, the responses from one or more agents of the entity can seamlessly appear to the user to be originating from the entity rather than directly from the agent. The agents responding to user messages may respond using any device or interface available to them rather than a dedicated device or location.

For example, a user sends message to a store to inquire whether a new electronic device is in stock at a particular store location. The message is transmitted to the communication service 102. The communication service 102 generates a chat session between the store and the users. The chat session is displayed to the user via the device 104. The message is transmitted to one or more agents of the entity. A corresponding chat session is generated for the one or more agents on the respective device 104. One or more agents of the entity respond to the inquiry with a response message within the chat session. The response message is transmitted to the communication service 102 and the communication service 102 transmits the response message to the user, via the device 104. The response message is displayed in the chat session and appears to be originating from the entity, rather than the agent. In one example, the chat session may include multiple messages between one user and multiple agents communicating on the entity's behalf. In another example, a new chat session may be generated by the communication 102 for any new or subsequent message from the user.

As described further below with reference to FIG. 6 and FIG. 8, agents 108 can establish themselves as available in the entity interface to communicate with users on behalf of the entities. Agents 108 who are available and have the authority to respond can be indicated as such in the entity interface 106 and messages can then be sent to the agents 108 on their respective devices. If one or more agents are available to represent the entity 116, then the entity 116 can appear "online" to the user in the personal user interface 110. If the entity is online, real-time online chats can be generated between the user 114 and the entity 116, represented by the agents 108, as soon as the user 114 receives the search results from the communication service. Similarly, agents 108 that are unavailable are visually indicated as such in the entity interface 106 and messages are no longer sent to those agents 108 on their respective devices. If no agents 108 are available to represent the entity 116, then the entity 116 can appear as "offline" to the user in the personal user interface 110.

According to some examples, as agents 108 establish themselves online they are automatically joined in any ongoing chat sessions between users 114 and any entities the agent is authorized to represent. In one example, the agents may be joined in by having the communication service transmit previous messages between users and the entity and display one or more chat sessions may be to the agent via the device. Furthermore, a communication history, comprising of one or more messages previously sent to and received from one or more users, may be displayed to the agent so they are aware of the current state of the discussion. The communication history may include messages from any period of time, such as for example the past hours, days or weeks. In another example, new chat sessions may be generated and displayed to the agent as new messages are sent from the users to the entities which the agent is authorized to represent.

If the device 104 is a mobile device, agents 108 can respond to user messages as part of their other duties and do not need to use a dedicated computer system. In some examples, the device 204 may not support a graphical interface. In this instance, the communication to and from the agent 108 can be provided via a messaging application supported by the device, for example SMS text or email messaging applications. In one example, the agent can register the phone with the communication service to provide user communications through that specific device using the messaging application supported on the device. For example, by registering the agent's mobile phone, the communication service can send SMS text messages to the agent's mobile phone every time a message from a user is sent to the entity. In this example, the agent can view the SMS text message in the SMS application available on the agent's phone.

In turn, the entity 116 can manage that authority given to the agent, including removing authority from the agent via the entity interface. In turn, various users can request authority to speak for the entity. For example, there may be a passionate community of people (e.g. fans, volunteers, or alumni) who may wish to speak on behalf of an organization.

The entity interface 106 can further provide for the entity or the communication service to authenticate the agents or users before granting authority to speak on behalf of the entity. Further, the authority given to the agents 108 can include one or more authority levels. These authority levels can allow the agent to invite and validate other agents or to agents to speak on behalf of the entity. These authority levels can also limit the ability of the agent to respond to certain types of inquiries. In one example, the authority level can correspond to the job description of the agent. For example, ability to issue refunds necessitates a high authority level.

Agents 108 can establish themselves as available for communication (or present) in the entity interface. The systems and method of establishing presence in the communication system are described in reference with FIGS. 6 and 8. Agents 108 that are available and have the authority to respond are indicated as such in the entity interface 106 and messages can then be sent to the agents 108 on their respective devices.

Conversely, if no agents 108 are available to represent the entity 116, then the entity 116 can appear as "offline" to the user in the personal user interface 110 and the user may be able to establish the real-time chat.

The entity interface 106 can further provide a back channel of communication for the agents 108. The agents 108 can use this back channel to discuss user communications and determine appropriate responses. The communication in the back channel can be transparent to the individual user.

The entity interface 106 can provide for one or more agents with authority to input and edit information regarding the entity, including communication information. The entity interface can further allow one or more agents to enter information that can be auto-generated by the communication service, including any token responses. The entity interface 106 can also allow one or more agents with authority to set up various communication channels, for example phone, email, web-chat, SMS, among others. The entity interface 106 can allow one or more agents to set preferences for each communications channel. By setting preferences, the communication service can determine through to which communication channel the message should be forwarded.

In one example, the entity, via the entity interface, may configure token responses designed to respond to frequently requested information. For example, the entity can provide token responses to inquiries regarding proposed legislation, ongoing litigation, pending investigations, future product releases, store openings and other frequently occurring inquiries. The communication service 102 can also communicate with a service provided by the entities or third parties to receive information from those services and generate a response to the user based on the information received. For example, third to party services can provide movie times, restaurant reservations and entity services can provide inventory lists and other services provided by entities and third parties.

Referring again to FIG. 3, according to some examples, the entity interface 106 may also display a list of all agents who are available at any given time and able to participate in the discussion. The entity interface 106 can also display to each agent the messages 404 from the users 114 to the communication service 102 and any entity responses to the users 114. The entity interface 106 can display communications from the viewing agent or it can display communications from any other agent representing the entity.

One or more agents 108 can be authorized to speak for the entity 116. In turn, the entity 116 can manage that authority given to the agent, including removing authority from the agent via the entity interface. In turn, various users can request authority to speak for the entity. For example, there may be a passionate community of people (e.g. fans, volunteers, or alumni) who may wish to speak on behalf of an organization. In this example, if the organization desired such communication, it can approve the user's authority within the entity interface. The entity interface can further provide for the entity or the communication service to authenticate the agents or users before granting authority to speak on behalf of the entity. In some examples, the entity interface can provide the entity to select a method of authentication. The methods of authentication can include verification through a communication channel. For example, requesting that the agent or user provide an email, a phone number, a website, matching the entity information and contacting the user or agent at that phone number, email or through the website.

Communication Service

Figure 4:
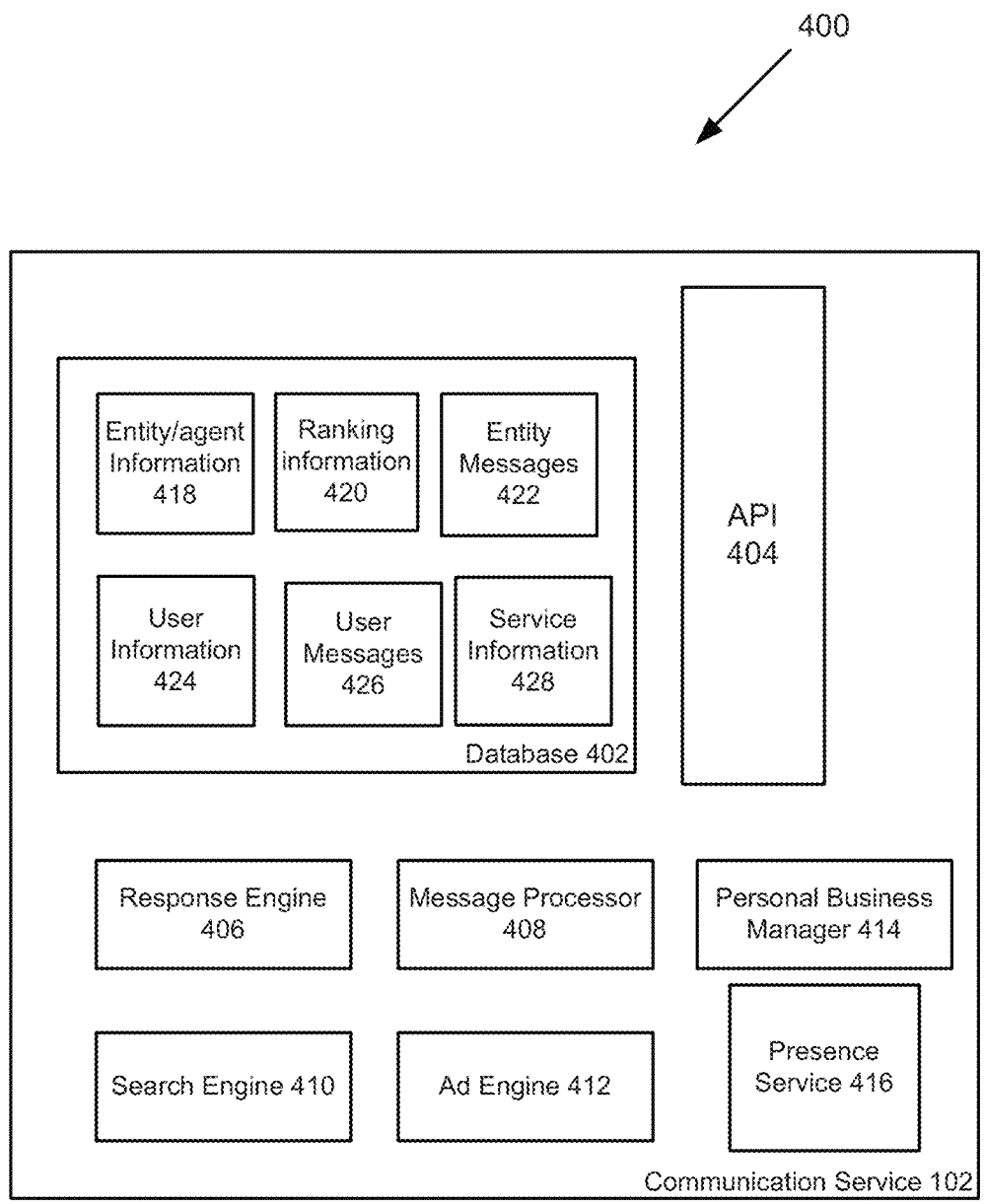
FIG. 4 is a block diagram of one example of a communication service according to another embodiment.

FIG. 4 shows an example of the communication service 102 according to various aspects of the present invention. In one example, the communication service 102 includes a database 402, an Application Programming Interface (API) 404, a response engine 406, a message processor 408, a search engine 410, an advertisement (ad) engine 412, a personal business manager 414 and a presence service 416. The communication service 102 may be implemented as a cloud-based computing platform, such as the EC2 platform, available from Amazon.com, Seattle, Wash. However, it should be appreciated that other platforms and cloud-based computing services may be used.

To enable seamless communication with the user, the communication service 102 generates multi-user chat sessions between the user and the agents 108, for any communication between the user and the entity. In one example, the presence service 416 can determine whether the entity is available or online using the methods and systems described below. According to one embodiment, if the entity is online, the communication service 102 receives a message sent from a user to an entity and generates a chat session. In one example, any new or subsequent message from one user to an entity is displayed in an existing chat session between the user and the agent. In another example, a new chat session may be generated by the communication 102 for any new or subsequent message. In one example, a chat session may include one or more messages between users and agents, who are participants in the conversation, displayed in respective interfaces: the personal interface displaying the chat session to the user and the entity interface displaying the chat session to the one or more agents.

In at least one example, if the entity is offline and no agent is available to communicate with the user on behalf of the entity, the communication service 102 may receives any messages from the user and initiate a workflow process, which may include one or more of the following steps. According to some examples, the steps may include: (1) attempting to transmit the message to one or more entities 116 directly through one or more communication channels; (2) transmitting the message to the call center 112 to obtain a response on behalf of the user; and/or (3) auto-generating a response to the message by the communication service 102. It is appreciated that other response steps or any combination of the above steps may be taken based on various examples.

In one example, when one of these steps is successfully used to get the message delivered to the entity, the reply from the entity can sent back into the chat session and displayed to the user as a response from the entity. As described above, when responding to the users, the agents 108 or call center employees can appear as a single virtual entity for the user in the in the personal interface 110. Alternatively, the user 114 can receive an indication that the response was provided by a particular agent on behalf of the entity (i.e. agent123@entity or callcenter123@entity).

The direct communication steps can include brokering the message from the user to the entity using any communication channels configured to receive the messages. In one example, the entity may have multiple communication channels defined that are able to receive messages, such as phone, email, web-chat, SMS, among other channels. Some communication channels may include social networking and microblogging services. Communication channels may allow the user to send text-based messages to the services, which may display or publish the messages to other users of these services. For instance, in one implementation, the messages may be sent to a third party microblogging service, such as Twitter available from Twitter, Inc San Francisco, Calif.

In one example, the entity may configure available communication channels via the entity interface 106. The communication service 102 can also determine through which communication channel the message can be sent to the entity. Alternatively, the communication service 102 may send the received message through every available communication channel. Further, communication service 102 may selectively send messages through communication channels until a response is received. In another example, the communication service 102 may send messages to the entity based on defined priorities of particular channels. The communication service 102 can make the determination of which communication channel may be used based on other criteria such as entity preferences, responsiveness associated with any of the channels, any predetermined rules, or any other information.

According to some examples, if direct communication steps are not successful in receiving a response from the entity, the communication service 102 can follow the call center steps to obtain a response to the message. In one example, the call center steps can include sending the message to the call center 112 to obtain one or more responses to the message. Alternatively, the call center steps can be performed in addition to, or instead of the direct communication steps. In one embodiment, the call center 112 may function as a personal assistant to obtain the requested information from one or more entities regardless of the communication channels available to the user and provided by the entity. The call center can essentially interject itself into the communication path and broker the communication between two distinct platforms. For example, the user may send a text or instant message to the entity. In this example, even if the entity is not configured to receive these types of messages, the call center can relay the message to the entity using another communication channel used by the entity, for example by calling the entity on the phone. The call center can obtain a response from the entity through the phone and then to provide the information back to the user in the generated chat session.

Call center employees can view and manage the received messages via the call center interface 118. The call center agents can obtain contact information for one or more entities, including one or more of the entity's communication channels. Once the contact information is obtained, the call center employees can contact the entity to obtain a response. The response message can then be transmitted back to the call center 112. In one example, the call center employee enters the chat session generated between the user and the entity and transmits the response to the user on behalf of the entity.

In some examples, either in addition to or instead of the direct communication steps and call center steps, the communication service may follow the auto-generated steps to provide an auto-generated response to the user message. In one example, the auto-generated steps can include generating the response by communication service 102 based on responses accessible from a database. Such information may be obtained from publically and privately available databases and/or third party services. In one implementation, the communication service can determine whether the response can be automatically generated and processes the message accordingly. For example, the communication service 102 can generate a response from information relating to contact information, directions, hours of operation, store locations, as well as any other information available from a database.

The API 404 can serve as an interface between the communication service 102 and various software programs and interfaces and further facilitate their interaction. In one example, the API 404 can interface components of the communication service 102 and the applications and software programs used by the devices 104, the entities 116, and/or the call center 112. The API 404 can include one or more discrete interfaces, for example, a user interface for interacting with the personal interface, an entity interface for interacting with one or more entities, and a service interface for interacting with the call center 112. The communication service 102 can further provide one or more related services through the API 404, for example, a service for ranking entities based on responsiveness, a service for federating web chats, a service for brokering web chats, and a service for determining user presence in a brokered web chat, among other services.

Such services can be provided to third party systems that are configured to receiving these services. These third party systems can be further configured to work integrally with the communication service 102. For instance, a daily coupon provider can integrate a communications interface into one or more applications or services offered by the coupon provider. Through this communications interface, the daily coupon can provide services or information offered by the communication service 102. Various techniques and protocols for communicating information may be used without departing from the scope of the examples disclosed herein.

In one example, a button may be placed on a website showing the coupon, that when selected by a user, initiates a communication, for example a chat session, with a business regarding the coupon item. This communication can allow the user to obtain information from the business about the coupon item, schedule appointments with the business, or provide feedback to the business.

In another example, a travel search website can integrate a communications interface into one or more applications or services offered by the travel search website. For example, a button may be placed on the travel search website along with any search results provided by the website. In this example, the button allows the user of the travel website to initiate a communication, for example a chat session, with a hotel, an airline or car rental service provided as part of the website's search results. This communication can allow the user, for example, to obtain information from the hotel, the airline or the car rental while within the interface of the travel website. For example, the user may have a question about the hotel property, make reservations for services provided by the hotel, or to provide feedback to the hotel.

The communication service 102 can be capable of storing information in the database 402, for instance, information relating to individual users 424, including user messages 426, information associated with entities and agents 418 including entity messages 422 and the call center or service information 428, including call center messages. The user information 424 can comprise of, for example, user identification, any history information, such as, entities previously contacted, messages previously transmitted and received, locations previously visited, devices associated with the users, and comments publically provided, among other user information.

The communication service 102 can be further capable of storing entity related information 418 in the database 402, for example, communication channels (phone numbers, text channels, email channels, web-chat systems, etc), preferred order of communication channels, organizational information for the entity (departments, subsidiaries, associated companies), associated agents of the entity, authority associated with the agents, location information for the entity, description of the entity, ranking information associated with the entity, previously transmitted communications 422, and any provided form responses, among other entity information.

The communication service 102 can be further capable of storing agent information 418, which can comprise of, for example, agent identification, agent status (available or unavailable), agent description, agent category (or job title), devices associated with the agent, previous messages from the agent 422, location information of the agent, authority level of the agent, among other agent information.

The communication service 102 can be further capable of generating and storing ranking information 420 in the database 402. In one example, ranking information can be based on the response time associated with the message if the message is answered with a delay between the message and the response (e.g., responsiveness). Rank information also can be based on a number of factors associated with the entity including, for example, prior attempts to communicate with the entity and the related number of instances of successful communications, instances of unsuccessful attempts to communicate with that entity, repeat instances of communication, among other factors. For example, if the entity responds to every message within a predetermined time, the entity may be ranked with a high degree of responsiveness. Conversely, if the entity never responds to any message, the entity can be ranked with a low degree of responsiveness.

In one example, ranking information 420 encourages entities to respond to messages from users 114 by displaying the ranking information to the users along with the search results. The ranking information 420 can be displayed next to the entity information, allowing the individual to make decisions about the entity based on the ranking information. Further, ranking information that identifies responsiveness can be used by the communication service 102 to perform various functions. For instance, the communication service 102 can also reorder the list of the entities based on the ranking information 420 when the user 114 initiates a search for entities. Ranking information based on responsiveness may also be used alone or in combination with other parameters to determine an order of the list of entities presented to the user. For example, other parameters can include proximity, communication quality, and presence of the entity in an chat system, customer loyalty and repeat customer rate. These parameters alone or in combination with each other and/or other criteria can be used to order search results.

The communication service 102 can be further capable of storing call center or service information 428 in the database 202, for example, call center agent identification, call center agent status, call center agent description, call center agent category, previous messages from the call center, location information of the call center agent, among other call center information. The communication service 102 can be further capable of storing additional values relating to messages from entities, the call center 112 or from users 114. For example, values can include time and date information, as well as response time to the message. In addition, messages can be correlated to each other and to other related or competing entities.

The users 114 may enter one or more search parameters into the personal interface 110 of the devices 104 to locate entities. The search parameters may then be sent to the communication service 102. The search engine 410 can receive search parameters from the devices 104 and generate search results based on the criteria set by the search parameters. The search results can be transmitted to the devices 104 and be displayed to the users 114 on the devices 104 via the personal interface 110. The search engine 410 may be capable of receiving and accepting one or more search parameters such as keywords, location information, categories and provide a list of entities matching the search parameters. In one instance, the search engine 410 can provide the search results based on rank information associated with the entity. In one example, the search engine 410 is a third party service located outside of the communication service 102. The communication service 102 can transmit the search parameters to the third party and receive the search results from the third party through the API 404. Commercially-available searching systems and algorithms may be suitable for implementing various aspects of the search engine 410.

According to various examples, as a message is received from the user 114 via the personal interface 110, the message is transmitted to the communication service 102. The message processor 408, part of the communications service 102 analyzes and processes the message. The message processor 408 can receive one or more messages from one of the devices 104 and the message processor 408 may determine how to process and respond to the messages. The message processor 408 can decode the message and to determine next steps based on any information, including the message content, entity information, user information and any pre-programmed set of rules, either alone or in combination with other information. To decode the message, the message processor 408 can extract entity information, inquiry information and any other relevant information from the message and can also determine one or more response paths including one or more response steps.

In one example, the message processor 408 can perform the functions to decode the contents of the message using one or more parsing methods, for example, various natural language understanding analyses. Such analyses can include, for example, lexicon components, syntactic or semantic analyses, keyword mapping or other methods. Various methods of deriving meaning from the context can also be used, for example, semantics, and pragmatic analyses, among other methods. In some examples, commercially-available systems of parsing and decoding may be suitable for implementing various aspects of the message processor 408.

The message processor 408 can translate the message into the language of the receiving entity. Upon receiving the reply from the entity, the message processor 408 can also translate the response into the language of the user. This method of brokering messages can allow any non-native speaking user to communicate with any entity. For instance, in one implementation, the message processor 408 can use a translation service provided by a third party, such as Google Translate available from Google, Inc, Mountain View, Calif.

As described in one example above, the users 114 can send a message, without first conducting a search, referencing one or more entities 116 or generally referring to an entity category. In one example, the message processor 408 can interact with the search engine 410 to determine the entity information from the message. As such, the message processor 408 can decode the entity information from the message and communicate the entity information to the search engine 410. The search engine 410 can return the list of entities matching the entity information in the message to the message processor 408. Alternatively, the general message can be transmitted to the call center 112 to handle the response.

User or entity presence can be provided to the user 114 through a variety of methods, including depictions of online presence in the body of a chat, in discussion history, or in search results. Displaying chat presence in search results themselves can be of particular note, as it may be beneficial to provide information within the personal interface that indicates an availability of an individual representing an abstract entity within results of the online search. In one embodiment, it may be useful to use availability information to influence an order of a result set from the online search, either alone or in combination with other criteria.

In another example, the ad engine 412 may display ads based on the type of entity the user has a history of communication with, or with whom the user is presently attempting to communicate. For example, if the user is attempting or has attempted to initiate conversations with one specialty retailer of consumer electronics, the ad engine 412 may display ads from a competing specialty retailer of consumer electronics.

In some examples, the ad engine 412, in conjunction with the message processor 408, may display ads based on the content of the message. For example, the message processor 408 may determine that the user is searching for a reservation at a particular restaurant during a particular time. The ad engine 412 may display ads from a similar restaurant along with a promotional coupon for that particular time frame. In one example, as the result of receiving a search input from a user for restaurants in Cambridge, Mass., the ad engine can display ads for restaurants, or internet coupon providers within two miles of Cambridge, Mass.

According to some examples, the ad engine 412, in conjunction with the search engine, may display ads based on entity's responsiveness. For example, if the specialty retailer of consumer electronics does not respond to a user inquiry within a predetermined period of time, the ad engine 412 may present the message from the user to a competing specialty retailer of consumer electronics and may allow the competitor to respond to the user's request. In another example, the ad engine 412 may display ads based on entity's online presence. For example, the ad engine 412 may allow the entity to advertise to users only if the entity has an online presence in the communication service 102.

According to some implementations, the communication service 102 can also include a personal business manager service 414. The personal business manager can function as a central conduit for communications and contact information by maintaining any information that relates to communication with an entity. Personal business manager can maintain and manage a list of entities the user previously contacted and set them up as favorites for easy communication. Each entity can have a user managed profile and can include entity information, such as contact and location-based information.

Personal business manager 414 can maintain a history of communications with those entities that can allow the user to provide confirmation of any entity assurances, guarantees, or agreements and store them for future reference. The personal manager can import business contacts from a contacts database on the device. The personal manager may also automatically store any entity information received as a result of any communication with that entity.

The personal business manager 414 can be accessible via the personal interface 110 on the devices 104. The personal business manager 414 can receive inputs for the user to record notes and set up reminders, for example to set up follow up communications with entities. Each entity entry in the personal business manager can have additional fields, such as, account numbers, frequent flyer numbers, pins, passwords, order numbers, as well as other entity related information. The personal business manager can allow the user to quickly provide the entity related information during communications with the entity.

Communication Service Process

Figure 5:
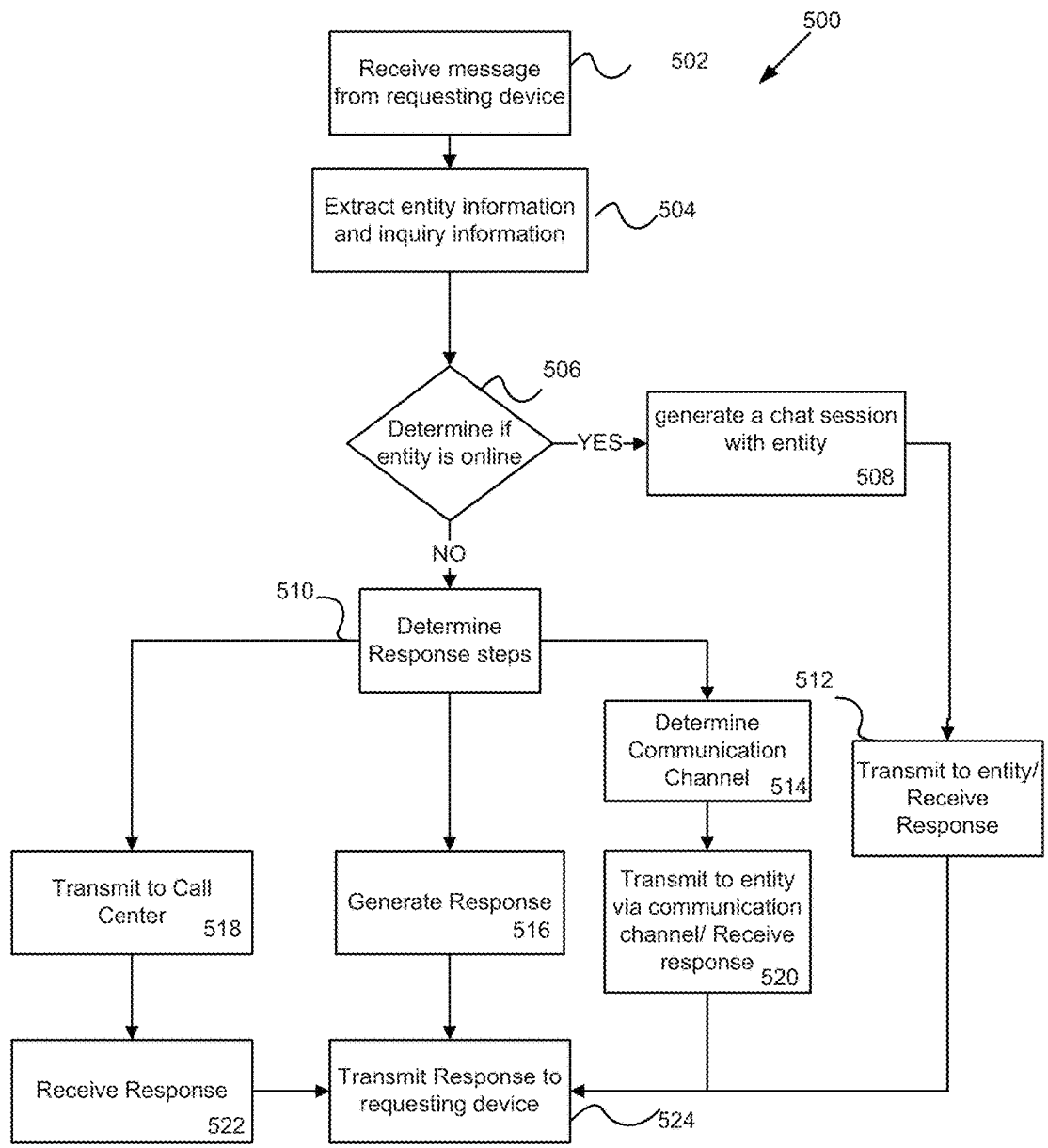
FIG. 5 is a flow diagram of a method for managing and enabling communication of information within the distributed communication system according to another embodiment.

An example of the method implemented by the communication service 102 is illustrated in FIG. 5. In this example, the process 500 includes act of receiving a message from a requesting device, parsing and decoding the message, extracting entity information and request information, determining response path, receiving response or generating a response and transmitting the response to the requesting device. Process 500 begins at 502.

In act 502, the communication service receives one or more messages from a requesting device. The messages can be provided to the requesting device by a user. The received messages can be stored in the database, along with any related information, such as user information and device information. In act 504, the entity information and the request information can be extracted from the message by the message processor 408. In one example, the received messages can be processed according to various methods, including parsing and decoding the content of the information. The entity information and to the request information can also be stored in the database. In act 506, the response engine service can determine if the entity is online or available using methods and systems described below. According to one example, if the entity is online, in act 508, the generates a chat session between the user and the entity.

In act 512, the message from the user is transmitted by the communication service 102 to the entity via one of the device 104 and the response from the entity is received by the communication service 102. In various embodiments, the message from the user to the entity may be brokered to one or more systems and communication interfaces that may be used by the entity, such as, for example, the various chat systems described below with reference to FIG. 6. In one example, the communications via the chat session can occur in real-time. In other examples, there may be a delay between the message and the response.

In act 510, if the entity is offline or unavailable, the message processor 408 can determine response steps to provide a response to the user. In one example, the response steps can be determined based on a preprogrammed set of rules, content of the message and entity information, and any preset preferences, as well as other information.

According to some examples, the steps may include: (1) attempting to transmit the message to one or more entities directly through one or more communication channels; (2) transmitting the message to the call center 112 to obtain a response on behalf of the user; and/or (3) auto-generating a response to the message by the communication service 102. In other examples, In act 514, a communication channel associated with an entity may be determined by the communication service 102. For example, the communication channel may include a chat system, an email address, a SMS message receiving device or any other communication channel. The communication channel or a communication channel token may be stored in the communication service 102 and accessed the communication service in response to the user message. In one example, multiple communication channels may be stored in the communication service 102. In various examples, the communication channels may be configured by the entity or agents of the entity via the entity interface and can determine a preferred communication channel or an order of channels. In this implementation, the entity can determine the most effective and efficient way of communicating with users requesting information from the entity. Alternatively, the to communication service 102 can determine which of the communication channels to use to transmit the user message to the entity, for example based on pre-programmed set of rules.

In act 520, the communication service 102 may transmit the message to one or multiple channels associated with the entity and determined at step 514. The entity or the agents receive the message and input a response. The response is transmitted to the communication service and receive a response from the entity via the same or a different communication channel. The response can be input by an agent of the entity via the entity interface, as described above.

In act 516, the communication service 102 may auto-generate a response to the message received by the user. As described above, the auto-generated response may be preset by the entity via the entity interface. In other examples, the auto-generated response may be generated by the communication service 102.

In act 518, the message may be transmitted to the call center. The call center can obtain a response to the request from one or more entities and transmit the response to the communication service. In act 522, the communication service receives the response from the call center. In act 524, the response can be transmitted to the requesting device. Prior to transmitting the response from the call center, the auto-generated response or the response from one or more entities can be generated based on the format accepted by the requesting device. It is appreciated that other response steps or any combination of the above steps may be taken based on various examples. Process 500 ends at 524. It can be appreciated that acts 518, 516, 514 or 508 can be performed or can be performed in the alternative.

Brokered Chat System

A person desiring to interact with different entities via a chat system is faced with having to search and seek out the location of the chat system. The chat systems may be different for each entity and may further include different interfaces, nomenclatures, keyboard and mouse commands, look and feel, ways of behaving, as well as different user system requirements. According to various embodiments, a brokered chat system is provided that allows the user of a communication service 102 a single place and a single universal interface to chat with any entities (businesses or organizations) without needing to be aware of the type of chat system the entities use, where that chat system is located, or how to interact with that particular chat system.

Figure 6:
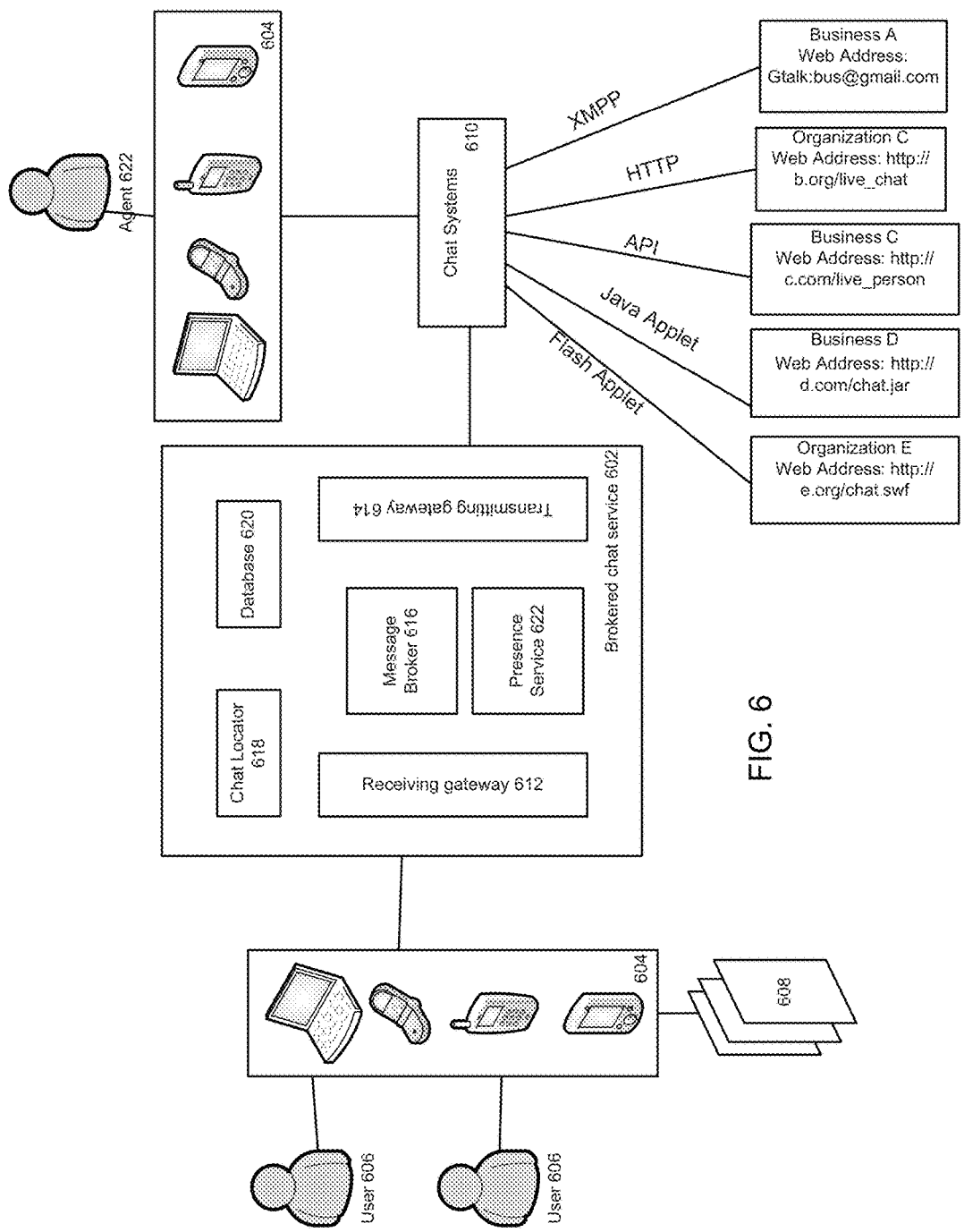
FIG. 6 is a block diagram of one example of a distributed brokered chat system according to another embodiment.

FIG. 6 shows an example of a distributed communication system 600 that incorporates aspects of a brokered chat system. In one example, the distributed communication system 600 includes a brokered chat service 602, devices 604, users 606, and messaging applications 608 installed on the devices 604, and various chat systems 610 used by agents 622 of various entities via the devices 604.

According to some embodiments, the brokered chat service 602 may be integrally incorporated with a communication service, such as the communication service 102 described above with referred to FIG. 1. In other embodiments, the brokered chat service 602 can be a single-standing service. In at least one example, the brokered chat service 602 may be implemented using a cloud-based computing platform, such as the EC2 platform, available from Amazon.com, Seattle, Wash. However, it should be appreciated that other platforms and cloud-computing services may be used.

According to various examples, one or more components of the distributed communication system 600 can be implemented using one or more computer systems, such as the distributed computer system 900 discussed below with regard to FIG. 9. Thus, examples of the distributed communication system 600 include a variety of hardware and software components configured to perform the functions described herein and examples are not limited to a particular hardware component, software component or a particular combination thereof.

The brokered chat service 602 can provide a universal chat client between the users 606 and various entities via a number of different online chat solutions that are provided on entity's websites. The brokered chat service 602 can seamlessly broker user's messages through the user's device directly to the entity's chat system. Because the user is using one device for every communication with the entity, the brokered chat service 602 can provide the online chat user a single, complete history of their interaction with multiple different entities in the online chats.

The users 606 within the distributed communication system 600 can communicate with various chat systems 610 via the messaging applications 608 on the devices 604. The devices 604 can include a cell phone, a smart phone, a feature phone, a PDA, a tablet computer, laptop computer, desktop computer or other system.

In one example, the brokered chat service 602 can receive a message from a sending device and deliver the message to a recipient device. For example, the brokered chat service 602 can receive a message from a sending device 604 and deliver the message to a recipient chat system 610. According to some examples, the devices 604 may include one or more messaging applications 608 for sending messages. Examples of such applications may include, but are not limited to, short-lived network socket applications, such as SMS based texting or email applications, long-lived network socket applications such as instant messaging (IM) or other chat applications. The messaging applications 608 may be part of the personal interface 110 described above in reference to FIGS. 1-6. Other long-lived network socket application can include one or more web-based or mobile web based messaging applications, such as for example, the GTalk software system, Y! Messenger system, MS Messenger system, or any other long-lived network socket application. The web-based applications may include script-based applications that are run from a web browser on one of the devices 604.

Communications between the users 606 via the devices 604, the agents 622 via the chat systems 610 and the brokered chat service 602 can be transmitted via any communication network through which devices may exchange data. The communication network may use various methods, protocols and standards, including, among others, Fibre Channel, Token Ring, Ethernet, Wireless Ethernet, Bluetooth, TCP/IP, UDP, DTN, or HTTP. The devices may also communication through a cellular radio network access such as Global System for Mobil communication (GSM), General Packet Radio Services (GPRS), Enhanced Data GSM Environment (EDGE), Wideband Code Division Multiple Access (WCDMA), among other communication standards. The network may further employ a plurality of cellular access technologies including 2nd (2G), 3rd (3G), 4th (4G or LTE) generation radio access for cellular systems, WLAN, Wireless Router (WR) mesh, and the like. Access technologies such as 2G, 3G, 4G and LTE and future access networks may enable wide area coverage for mobile devices. In essence, network may include any communication mechanism by which information may travel between the devices and another computing device in the network.

The messaging applications 608 and the associated communication protocols used by the sending device can be different than the messaging applications and communication protocols used by the receiving devices and each of the chat systems 610. In one example, each of the chat systems 610 may need to be integrated into the brokered chat service 602 to prior to brokering the communications between the devices 604 and the chat systems 610.

The plurality of disparate chat systems 610 used by various entities may include, but are not limited to, consumer instant messaging software such as the GTalk software system, provided by Google Inc, Mountain View, Calif. the Y! Messenger system, provided by Yahoo! Sunnyvale, Calif., the MSN Messenger system provided by Microsoft, Redmond, Wash., the AOL Instant Messenger system provided by AOL, New York, N.Y., as well as other types of consumer chat software. The chat systems 610 used by various entities may include, but are not limited to, commercial web chat software such as the LivePerson system provided by LivePerson Inc, New York, N.Y., the Olark software system provided by Habla, Inc. Palo Alto, Calif., the Velaro software system provided by Velaro Inc, Elkridge, Md., the BoldChat software system provided by Bold Software LLC, Wichita, Kans., the RealChat system provided by RealChat Software, Sofia, the Bulgaria system, as well as other types of commercial web chat software. In at least one example, the chat systems may include proprietary web chat software. In other examples, chat systems 610 may include short-lived network socket applications, such as SMS based texting or email applications, as well as messaging applications included in the personal interface 110 described above in reference to FIGS. 1-4.

The brokered chat service 602 can facilitate conversations (or chat sessions) between users 606 using different messaging applications, devices and protocols and chat systems 610 using different communication protocols. In one example, the brokered chat service 602 includes a receiving gateway 612, a transmitting gateway 614, a message broker 616, a chat address locator 618 and a database 620. The receiving gateway 612 can be configured to receive messages using various protocols from various sending devices 604. The message from one or more of the sending devices can include metadata regarding the protocol used by the originating device, message content and destination information. The destination information can include the entity for which the message is intended. The receiving gateway 612 can forward the message to the message broker 616. The message broker 616 can receive the message and extract message contents, the metadata containing protocol information, and the destination information.

The brokering chat service 602 locates and maintains information on various entities, such as protocol information and network resource identifier (or web address) associated with the entity's chat system 610. In one example, the information may include to a plurality of network resource identifiers on the World Wide Web that each entity has provided as a means for users to chat with them. In one example, the network resource identifiers may be in the form of uniform resource identifiers (URI). The URI may be in the form of a Uniform Resource Locator (URL), such as http://b.org/live_chat, or the URI may be in the form of an email address or a user identification, such as Gtalk: bus@gmail.com. When a user identifies the entity they want to chat with, the chat address locator 618 retrieves corresponding chat addresses for the entity.

According to various examples, the chat address locator 618 may obtain the network resource identifiers from chat system information stored into the database 620. In one example, the network resource identifiers may be entered by one or more entities through the entity interface 106 described above with reference to FIG. 1. In another example, the network resource identifiers may be entered by providers of the communication service 102 or by employees of the call center 112. In another example, the chat address locator 618 may obtain the network resource identifiers from a third party storing one or more of the network resource identifiers remotely from the brokered chat service 602. One example of a third party is a web-based database of customer service information for companies worldwide provided by GetHuman.com, Boston, Mass.

In another example, the chat address locator 618 may, in real-time, locate the chat addresses from the entity's website as a user initiates communication with the entity. According to some embodiments, the chat address locator 618 can access a catalog of known chat system signatures, which may indicate that a chat system is present on a particular entity website. Signatures may include the presence of certain scripts or applets, such as JavaScript, Adobe Flash and Flex applets, as well as other protocols or scripts and may be unique to a particular chat system 610. Each signature for each chat system 610 may also be stored in the database 620. The chat address locator 618 can combine the signature with the starting or main network resource identifier for the entity (e.g. http://apple.com).

The chat address locator 618 can use a method of web crawling (e.g. using a web spider or crawler) through the entity's website. The web crawler can index the words on the entity's web pages and can follow every network resource identifier (or web link) found within the web page. In one example, the web crawler can first index commonly located web pages through common phrases that may indicate chat system such as to "contact us," "support," "chat," "live chat," "service" and "sales," as well as any other commonly used phrases. The chat address locator 618 can then detect the presence of a chat system on one of these web pages and store the corresponding network resource identifier in the database 620.

When the user initiates communication with the entity through the brokered chat system 602, according to one embodiment, the user's chat messages are brokered to the corresponding chat system 610. Chat responses from the entity via the chat system 610 are similarly brokered back to the user. The message broker 616 can receive the messages from the sending device of one protocol and transmit the message to the corresponding chat system 610 having another protocol via the transmitting gateway 614. As a response message is sent by the chat system 610, the receiving gateway 612 can receive the response message, which can be converted into the protocol of the now receiving device 604 by the message broker 616 and can be transmitted to the receiving device 604, via the transmitting gateway 614. The receiving device 604 can display the response message to the user via one of the messaging application 608. In this manner, the user conducts a chat with the business or organization using the brokered chat service 602 without needing to know the network resource identifier of entity's online chat or how to use the one of the many types of chat systems that the entity is employing to provide the online chat.

According to some examples, the message broker 616 may use a number of different methods to broker the message from one protocol to another. The methods of brokering may depend on the protocol used by the messaging application 608 and the chat system 610. The plurality of chat protocols used by the discrete chat systems used by various entities may include, but are not limited to XMPP, HTTP, Web chat system APIs, Java applets and JavaScript, Flash and Flex applets provided by Adobe Systems Inc, San Jose, Calif. as well as other protocols.

In one example, to access the information associated with a particular chat system 610, the various chat systems 610 may need to be integrated into the brokering chat service 602. To integrate a particular chat system 610, information regarding the chat system 610 such as the corresponding chat protocol for the particular chat system, a method for brokering with the particular chat system, and the unique signature associated with the chat system can be stored in the database 620. Examples of brokering methods may include, but are not limited to, XMPP chat federation, HTTP APIs, Web chat system to APIs, Java applet automation, Flash and Flex applet automation, and JavaScript invocation.

For example, the message broker 616 uses a method of XMPP federation to broker messages between a device using a SMS messaging application and an entity using a Gtalk chat system. In another example, the message broker 616 uses the method of XMPP Federation to broker messages between a mobile device using messaging application on the personal interface 110 (e.g. iOS application) and an entity using MS Messenger chat system. In another example, the message broker 616 uses a method of HTTP chat API to broker messages between a device using a web-based messaging application on the personal interface 110 and an entity using LivePerson messaging application on the entity's webpage. In another example, the message broker 616 uses a method of JavaScript chat API invocation to broker messages between a device using a email-based messaging application and an entity using Olark messaging application on the entity's web page.

For chat systems that are not easily integrated through one of the methods described above, the message broker 616 can act as a web browser and connect to the entity's online chat web page. The message broker 616 can input user generated messages on behalf of the user into the chat system and can obtain responses by a method of "screen scraping" the responses from the chat system 610.

In some examples, various chat systems located on websites include particular browser requirements, preferring one browser type over another. These websites may also include code to detect browser types and to adjust, change or prohibit access from particular browser types. Thus, the message broker 616 may spoof the identification of the broker chat service 602 to obtain chat system content.

The brokered chat service 602 may provide a history of communications between user/device and the entities and can provide the message history to the devices, which can display the message history to the user. In one embodiment, the brokered chat service 602 may assign a unique identifier to each user and each entity communicating via the brokered chat service 602, which may then be stored in the database 620. In this fashion, the brokered chat service 602 maintains a complete chat history for the user, a complete chat history for the entity, and a complete chat history for the user/entity pair. In one to example, as the user accesses the communication service 102, the brokered chat service 602 retrieves a history of the user/entity chat interactions with any plurality of entities from the remotely located, disparate chat systems 610 by using the specific user unique identifier. In addition, a series of multiple chat interactions with a single entity over time can be retrieved together by using the user unique identifier and entity unique identifier pair. Finally, the brokered chat service 602 can provide the business entities a history of user chat interactions with any user by using the entity's unique identifier.

Brokered Chat Process

Figure 7:
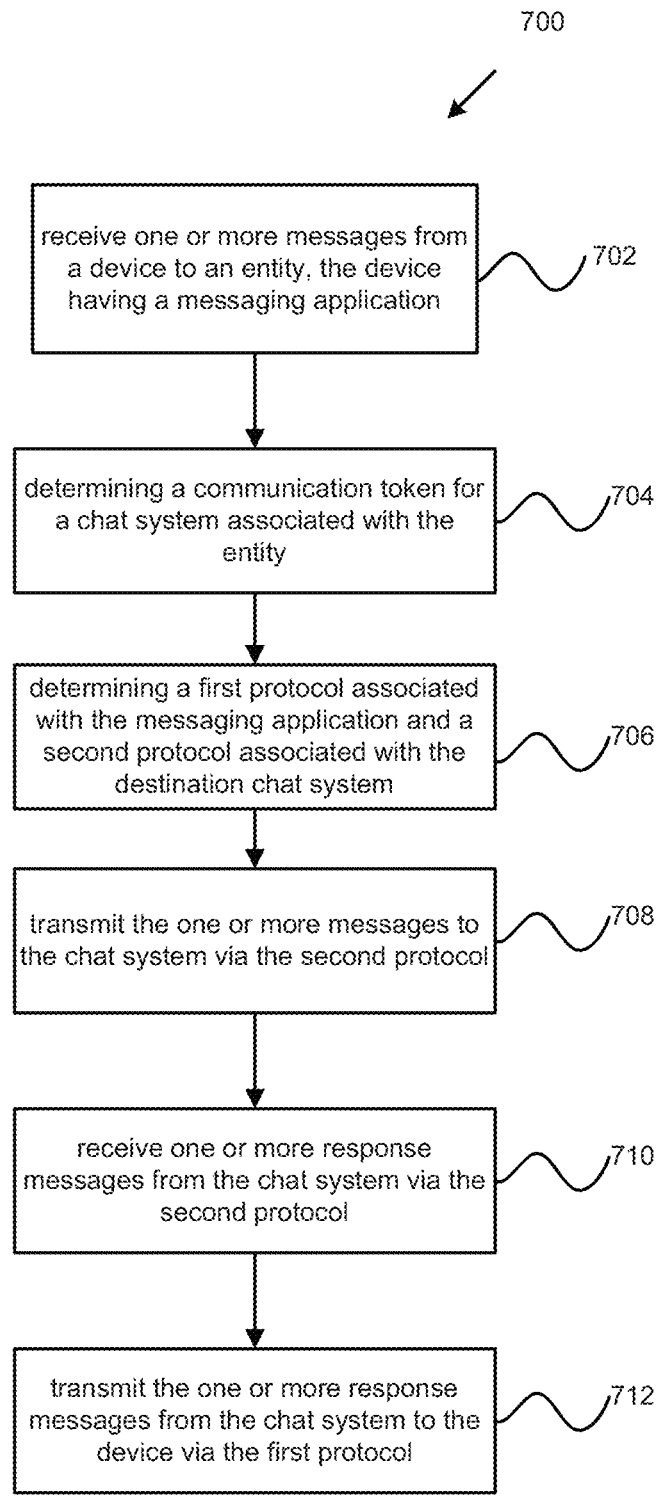
FIG. 7 is a flow diagram of a method for brokering communications within the distributed brokered chat system according to another embodiment.

An example of the method implemented by the brokered chat service 602 is illustrated in FIG. 7. Process 700 begins at 702. In act 702, the brokered chat service receives one or more messages to an entity from a device having a messaging application. The brokered chat service may receive one or more messages from different devices having different messaging applications. Users may also send messages to different entities having different chat systems. As described above, the different messaging applications and the different chat system may use different messaging protocols.

In act 704, the brokered chat service determines a communication token for a chat system associated with the destination entity. In one example, the communication token may be phone number associated with a mobile device capable of receiving messages. In another example, the communication token may be a network resource identifier for a chat system associated with the destination entity. For example, the network resource identifier may be a URI, as discussed above. In act 706, the brokered chat service determines the protocol of the messaging application used by the device and the protocol of the chat system used by the chat system. The chat system may be integrated into the brokered chat service and the protocol associated with the chat system may be stored in a database. Instructions for how to broker the messages to the chat system may also be stored in the database.

The brokered chat service acts as a universal chat system to transmit messages from one device having a messaging application that uses a particular protocol to a chat system that uses the same or a different protocol (act 708). In turn, the brokered chat service may also receive one or more response messages from the chat system, via the second protocol (act 710). The brokered chat service may transmit the one or more to response messages to the device via the first protocol (act 712). The process ends at act 714. In this way, the brokered chat system allows the user of the communication service 102 a single universal interface to chat with any entities without determining first the type of chat system the entities use, and how to locate that chat system. The user simply types in a message to the system and the brokered chat services brokers to the systems the entity already has in place.

Detecting Presence

As described above, the users of the communication service 100 and/or the brokered chat service 602 can establish chat sessions with various entities. In turn, entities can respond to users via the agents 108 using the chat systems 610. As described above, it may be desirable to establish presence of entities via the agents in the communication service and the brokered chat service 602. For example, the entities can be shown as available to answer user inquiries when the user performs a search for entities using the communication service 102. Entity availability may affect the arrangement of search results and may further encourage users to contact the entity.

If the communication channel between entities and users is facilitated using TCP/IP protocol, it may be possible for instant messaging client software to open a network socket to a chat server. While the network socket is held open, the person can convey messages using the chat client over this network. The presence of the open network socket connection to the chat server may be used to establish presence of the user of the chat client in the system. If there is at least one open network socket connection for the user, the user may be shown as being present to other users of the chat system. If no open network socket connection exists for the user, the user is shown as being absent to other users of the chat system. According to one embodiment, users indicated as being absent from the system do not receive messages from other users.

However, it is desirable to allow users of networks and protocols other than long-lived network sockets on the primary shared TCP/IP network of the chat system to participate in chat systems, such as Short Message Service (SMS) (i.e. text messaging) communication networks or email based communication networks, such as those based on SMTP, POP or IMAP protocols. In these cases, communication brokers can be used to connect chat systems over TCP/IP networks with different communication protocols. A network communication broker sits at the boundary between a chat system's primary shared communication network and protocol and another network or protocol, translating and passing chat messages between the disparate methods of communication.

Characteristics of typical brokered networks or protocols differ significantly from long-lived network sockets on a TCP/IP network. Specifically, many of the networks and protocols that are desirable to be brokered (SMS or SMTP/POP/IMAP) cannot establish a long-lived connection. Without establishing the long-lived connection, typical methods of establishing presence may not be used.

One possible solution to establishing presence in a brokered chat network with short-lived network sockets includes using a method of polling. Rather than one long-lived connection, polling may include a series of short-lived connections over time, which serve to establish continued presence in the chat network. The absence of short-lived connections over a period of one or more expected intervals in time represents absence of the user from the chat network. Similarly, existence of short-lived connections during the periodic time interval allows the chat server to establish the brokered user as being present in the network.

However, this method of frequent polling over short-lived network sockets and communication protocols requires considerable overhead, cost or disruption experienced by the brokered user. Often in these chat systems, the chat brokering is provided without presence, representing the brokered user's presence as unknown in the chat system. Thus, other users in the brokered chat would not know whether the user is able to receive and respond to messages.

Within the brokered chat service 602, the presence service 622 can allow the users of the distributed communication network 600 to establish presence in the chats regardless of the messaging applications and the associated protocols used by them. The presence service 622 can establish user presence with a method of checking-in and checking-out.

When the users 606 are available to chat, the users 606 via one of the devices 604 send a check-in message to the presence service 622. The presence service 622 establishes that particular user as available in the brokered chat service 602. The user's available status may be displayed to the other users of the brokered chat service 602. The available status may be displayed by showing various indications, including visually moving the to user's identification in the messaging applications from an unavailable list to the available list of users. Other indications can include color or sound indications notifying the other users of the change of status of the user in brokered chat service 602.

The available user can receive communications from other users of the brokered chat service 602. When the user no longer wishes to be part of the brokered chat service 602 and receive messages from other users, the user may send a check-out message to the presence service 622 to establish the user's absence in the brokered chat service 602. The presence service 622 receiving the check-out message can establish the user as absent in brokered chat service 602. The user's absence can be indicated by visually moving the user's identification to the unavailable list in the messaging applications. Similarly, the user's absence can be indicated in color and/or sound.

The check-in and check-out messages may be any format supported by the user's device. For example, if the user is communicating through a feature phone, the check-in and check-out messages sent to the presence service 622 may be SMS messages. In another example, if the user is communicating via a smart phone, the user can visually select an option in the smart phone's interface. The smart phone may then transmit that selection as a message to the brokered chat system 602. Similarly, if the user is communicating via a laptop, the user can send an email to the brokered chat service 602.

In one example, if the user does not respond to messages from users of the brokered chat service 602, the presence service 622 can determine whether the user continues to be present in the brokered chat service 602 and is available to receive messages. In one example, the presence service 622 can send an inquiry message to a non-responding user to determine continued presence in the brokered chat service 602. The inquiry message can prompt the non-responding user to indicate whether the user wishes to maintain presence in the brokered chat service 602. A positive response to the inquiry message maintains the user's presence and a negative response establishes the user's absence and indicates the user as unavailable.

According to some examples, if the user does not reply to the inquiry message within a predetermined period of time, the user can be established as absent and indicated as unavailable. The predetermined time period may be specific to the communication channel used by the user. For example, the predetermined time period for a user communicating through email may be two hours, while the predetermined time period for SMS communications may be one hour.

The agents 108, using the communication service 102 described above with reference to FIG. 1 via the interface described with reference to FIG. 6 can use the brokered chat service 602 and the presence service 622 to respond to user inquiries and establish presence in the communication service 102. If no agents 108 are available to represent the entity 116, then the entity 116 appears as offline to the users in the personal user interface 110. If at least one agent 108 is established as available, the entity appears online and users can establish brokered chat communications with the entity. The agents 108 can establish their presence or absence though the presence service described above. The agents 108 can establish their presence and absence by sending check-in and check-out messages to the brokered chat system.

According to some examples, the inquiry message sent to the agent may be different if the agent is the only agent representing the entity. For example, presence service can notify the agent that at the agent must reply to in a timely manner or risk causing the entity to appear offline.

Presence Service Process

Figure 8:
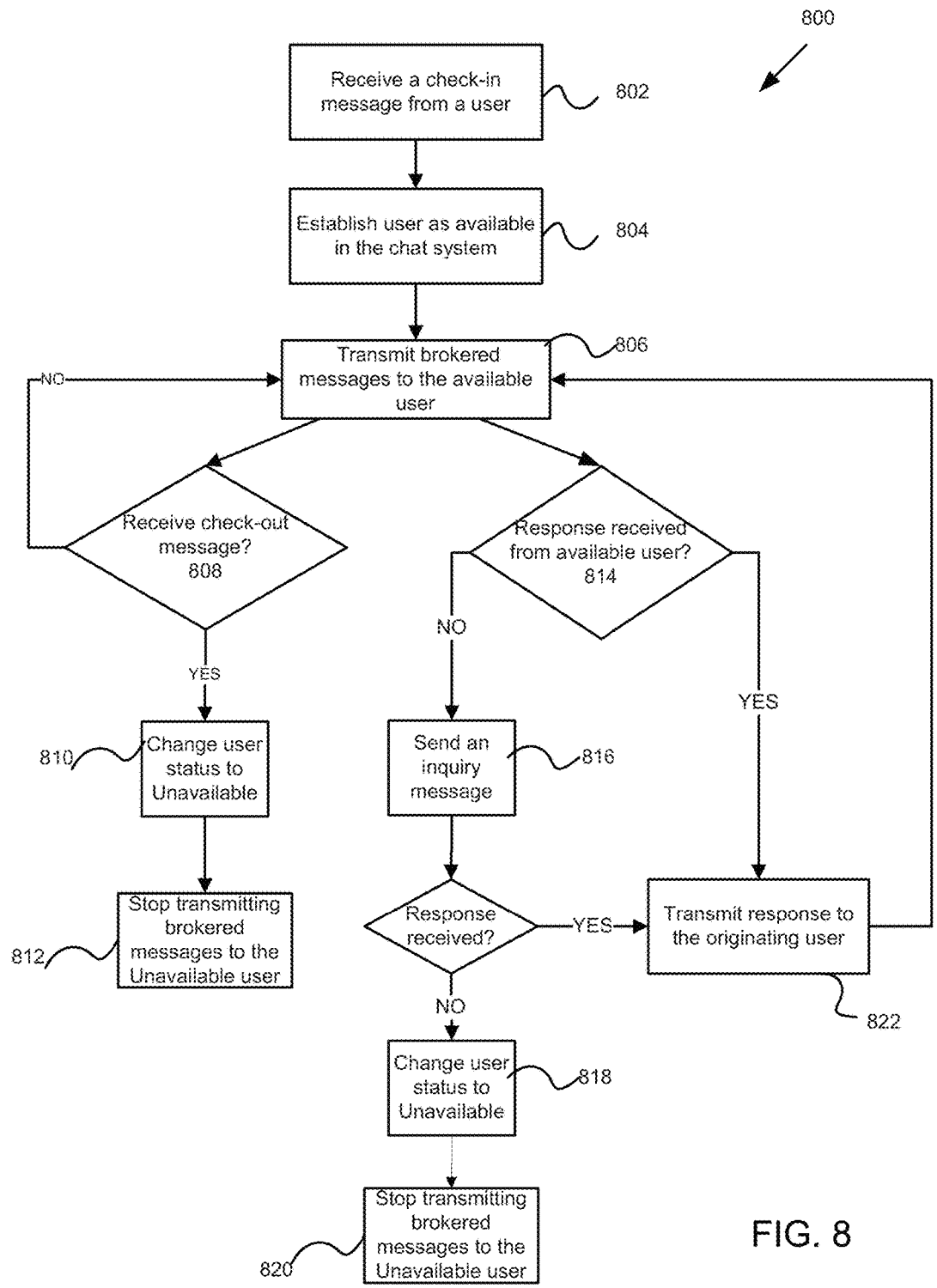
FIG. 8 is a flow diagram of a method for determining presence within the distributed communication system according to another embodiment.

An example of the method implemented by the presence service in a brokered chat service 602 is illustrated in FIG. 8. In this example, the process 800 includes the acts of receiving a check-in message from one of the users via one of the devices, establishing the user as available in the chat system, transmitting brokered messages to the available users, sending an inquiry message and if no response is received, establishing the user as not available.

Process 800 begins at act 802. In act 802, presence service receives a check-in message from a user of the brokered chat system. The message can be in any format accepted by the brokered system, for example, a SMS message, email message or any other format. The message can be inputted via an interface on one of the devices, such as the personal and the entity interface described above. In act 804, the presence service may receive the check-in message and can establish the user's status in the brokered chat service 602 as available. If the user is an agent representing an entity, the agent can be shown as available within the entity interface. Other agents may see the user as available in their respective entity interfaces. If the agent is the first available user, the entity status to within the communication service can also be indicated as available and shown as "online" to any user searching for the entity.

In act 806, the brokered chat messages can now be transmitted to the available user. In one example, if the user is an agent, the brokered messages may be displayed in the entity interface. In another example, if the user is an individual the brokered messages to the individual can be displayed in the personal interface. In some examples, if the user's device is a feature phone, as described further below, the brokered chat messages can also be displayed in any messaging applications supported by the device.

In one example, brokered messages received by the brokered chat system while the user was unavailable may be stored in the brokered chat service and can be sent to the user when the user is established as available. In another example, if the user is an agent, when the agent is established as available, any previously received messages directed to the entity of the agent can also be sent to that agent. For example, messages received by the brokered chat service within the last 24 hours, 12 hours, or one hour can be sent to the agent.

The presence service can indicate the user as available until either a check-out message is received from the user (act 808) or no response is received from the user after a predetermined time period (act 814). In act 808, if a check-out message is received from one or more users, in act 810, the user's status in the brokered chat service 602 is changed from available to unavailable. In act 812, the brokered chat service 602 can suspend transmitting brokered messages to the user. If no check out message is received, in act 806, the brokered chat service 602 can continue to transmit brokered messages to the user.

In act 814, the brokered chat service 602 waits for a response from the receiving user. In one example, the receiving user can be an entity and any agents authorized to respond can respond on behalf of the entity. If no communication is received within a predetermined period of time, in act 816 the presence service 622 transmits an inquiry message to the user. The inquiry can be a message window within an entity or personal interface. In one example, if the user's device is a feature phone, the inquiry message can be a message sent to the messaging application of the user's device, using any protocol supported by the device.

In act 818, if no response is received the user's status in the brokered chat service to 602 can be changed from available to unavailable. In act 820, the brokered chat service 602 may no longer transmit messages to the user. In act 822, if a response is received, the brokered chat service 602 brokers the message to the designated user. If the user is an individual the response message is displayed in the personal interface via one of the devices. In act 806, the brokered chat service 602 can continue to transmit brokered messages to the user.

Processes 500, 700 and 800 describe one particular sequence of acts in a particular example. The acts included in processes 700, 800 and 900 may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

Virtual SMS Phone Number Generation

Devices without a full-featured graphical interface (i.e. feature phones) may use the communication service, the brokered chat service and the presence service described above with reference to FIGS. 6-8. According to some examples, SMS messaging applications may be available on these devices and may enable communication with entities through one or more SMS or text messages. The devices may have designated phone numbers assigned to them by the mobile service provider that enable SMS communication between users. The user receiving the SMS messages can see the designated phone number of the originating device.

However, users, agents or call center employees of the communication service and the brokered chat service may desire to keep personal phone number private. Embodiments described herein include a SMS center that assigns virtual SMS phone numbers to users, call center employees, entities or any of the entity's agents within the communication service and the brokered chat service. The virtual SMS phone numbers ensure privacy for the users, the agents and the call center employees. Entities that have multiple agents (or call center employees) communicating on their behalf can use the virtual phone numbers to communicate with users as a signal virtual entity. According to some examples disclosed herein, by utilizing a virtual phone number pool, the communication service provider can conserve the use of unique SMS numbers. Unique SMS numbers can be leased from the mobile service provider, with additional SMS numbers incurring additional expenses for the communication service provider. According to one embodiment, the SMS center can assign virtual phone numbers from a pool of virtual phone numbers to reduce the total number of phone numbers to be leased from the mobile service provider.

According to some embodiments, the communication service 102 or the brokered chat service 602 may include a SMS center that received SMS messages from devices and assigns virtual SMS phone numbers to the users, entities and agents. In one example, the user sends SMS messages through SMS messaging application to the SMS center to find entities and to initiate communication with those entities. According to some examples, the user may direct communication to the SMS center by sending messages to a designated SMS center phone number.

The SMS center can receive, store and forward the SMS messages to any entity and may additionally process the SMS message. For example, the SMS center or the communication service can perform a search for the entity matching the description and/or location and provide to the user or more matching search results to the user with one or more SMS messages. The SMS center may also provide for the user to input additional parameters, for example words, letters, numbers, or symbols to make use of specific features of the SMS center. For example, the user may input "search" or "locate" followed by the entity's name to search for a particular entity, or "message" followed by the entity name and the message content to communicate a message to the entity.

According to some examples, virtual phone numbers may be any phone numbers leased by the communication service from a mobile provider. The virtual phone numbers may be part of a virtual phone number pool and may be assigned and re-assigned to any user of the communication service. The SMS center may assign a virtual SMS phone number to any user at any first to communicate with the SMS center or any entity using the communication service. According to some examples, the entity receiving a SMS message from the user through the SMS center receives the SMS message as though it appears to originate from one of the virtual phone numbers, while the phone number associated with the user's device is kept private by the SMS center.

Similarly, a virtual phone number can be assigned to any entity, agent or call center employee communication with users through the communication service. The user receiving a response from the entity through the SMS center may receive the SMS message as though it originated from one of the virtual phone numbers, while the entity's or the agent's phone number is kept in private by the SMS center. The same entity virtual phone number can further be used by one or more agents 108 or call center employees 112 using one or more devices. The devices and the agents using those devices can be configured and managed through the entity interface. Any SMS message from the agent or call center employee responding on behalf of the entity can be received by the user as originating from the entity's virtual phone number. Using the virtual number, the agent's or the call center employee's personal phone number can be hidden from the individual user. The entity's virtual phone may allow the entity to appear as a virtual identity for any user receiving SMS responses from the multiple agents or call center employees.

According to some embodiments, the virtual phone numbers can be assigned from the virtual phone number pool and can be shared between users of the SMS centers on a per-conversation basis. When a message is received by the SMS center from a user, the SMS center selects one of the virtual phone numbers from the virtual phone number pool. This virtual phone number can then be used to deliver the message to the entity and any agents operating on its behalf. This virtual phone number from the virtual phone number pool can be used to represent a particular user in the conversation with a particular entity and is unique to that online chat session.

When the chat session concludes the virtual phone number may be returned to the virtual phone number pool and can then be assigned to other users for conversations with other entities. That returned virtual phone number can be re-used to represent same users in chat sessions with different entities, as well as different users in discussions with different entities. The number of virtual phone numbers available in the pool may vary with the number of unique user-entity combinations. The total number of virtual phone numbers in the pool may correspond to the entity that has the largest number of discussions with the largest number of unique users. As the number of unique users increases, the communication service may need to lease additional numbers from the mobile service provider.

Computer System

As discussed above with regard to FIGS. 1-8, various aspects and functions may be implemented as specialized hardware or software executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 9:
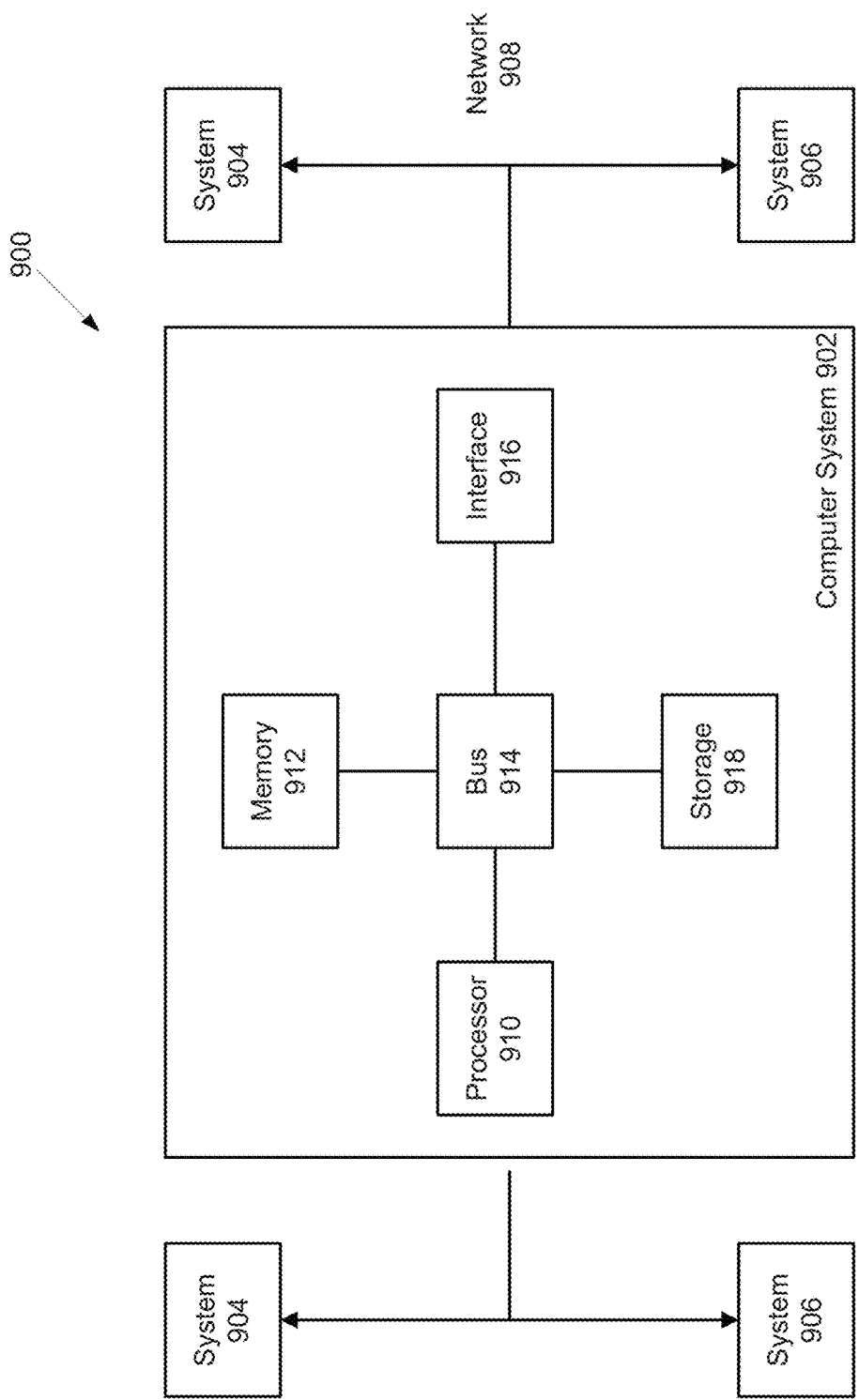
FIG. 9 is a block diagram of one example of a computer system that may be used to perform processes and functions disclosed herein.

Referring to FIG. 9, there is illustrated a block diagram of a distributed computer system 900, in which various aspects and functions may be practiced. The distributed computer system 900 may include one more computer systems that exchange (i.e. send or receive) information. For example, as illustrated, the distributed computer system 900 includes computer systems 902, 904 and 906. As shown, the computer systems 902, 904 and 906 are interconnected by, and may exchange data through, a communication network 908. The network 908 may include any communication network through which computer systems may exchange data. To exchange data using the network 908, the computer systems 902, 904 and 906 and the network 908 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 902, 904 and 906 may transmit data via the network 908 using a variety of security measures including, for example, TLS, SSL or VPN. While the distributed computer system 900 illustrates three networked computer systems, the distributed computer system 900 is not so limited and may include any number of computer systems and computing devices, networked using any medium and communication protocol.

As illustrated in FIG. 9, the computer system 902 includes a processor 910, a memory 912, a bus 914, an interface 916 and data storage 918. The processor 910 may perform a series of instructions that result in manipulated data. The processor 910 may be a commercially available processor such as an Intel Xeon, Itanium, Core, Celeron, Pentium, AMD Opteron, Sun UltraSPARC, IBM Power5+, or IBM mainframe chip, but may be any type of processor, multi-processor or controller. The processor 910 is connected to other system components, including one or more memory devices 912, by the bus 914.

The memory 912 may be used for storing programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device. Various examples may organize the memory 912 into particularized and, in some cases, unique structures to perform the functions disclosed herein and these data structures may be tailored to store values for particular types of data.

Components of the computer system 902 may be coupled by an interconnection element such as the bus 914. The bus 914 may include one or more physical busses, for example, busses between components that are integrated within a same machine, but may include any communication coupling between system elements including specialized or standard computing bus technologies such as IDE, SCSI, PCI and InfiniBand. Thus, the to bus 914 enables communications, such as data and instructions, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and communicate with external organizations, such as users and other systems.

The data storage 918 may include a computer readable and writeable nonvolatile (non-transitory) data storage medium in which instructions are stored that define a program or other object that may be executed by the processor 910. The data storage 918 also may include information that is recorded, on or in, the medium, and this information may be processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller may cause data to be read from the nonvolatile recording medium into another memory, such as the memory 912, that allows for faster access to the information by the processor 910 than does the storage medium included in the data storage 918.

The memory may be located in the data storage 918 or in the memory 912, however, the processor 910 may manipulate the data within the memory 912, and then copy the data to the storage medium associated with the data storage 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 910 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a to graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

It should be understood that the various embodiments of the present invention are not limited to each of the embodiments described herein, but rather, various embodiments of the invention may be practiced alone or in combination with other embodiments. Based on the foregoing disclosure, it should be apparent to one of ordinary skill in the art that the embodiments of the present invention are not limited to a particular computer system platform, processor, operating system, network, or communication protocol. Also, it should be apparent that the various embodiments of the present invention are not limited to a specific architecture or programming language.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A method for determining status of an entity in a brokered chat service, the method comprising acts of:
    establishing the status of the entity in the brokered chat service based on an availability of a plurality of agents representing the entity, wherein establishing of the status of the entity comprises:
        establishing the status of the entity as online when at least one agent of the plurality of agents is established as available to represent the entity; and
        establishing the status of the entity as offline when no agent of the plurality of agents is available to represent the entity;
    transmitting at least one message to the at least one available agent via the brokered chat service while the status of the entity is online;
    responsive to not receiving a response to the at least one message from any of the at least one available agent within a predetermined time period, sending an inquiry message to the at least one available agent, the inquiry message being different from the at least one message and the inquiry message inquiring of the at least one available agent about whether to maintain presence status associated with the entity in the brokered chat service;
    updating the status of the entity in the brokered chat service base on a response to the inquiry message;
    receiving a search request for the entity; and
    ranking the entity in search results based on the status of the entity in the brokered chat service.

2. The method of claim 1, further comprising receiving a check-out message from the at least one available agent, via the brokered chat service.

3. The method of claim 2, further comprising establishing the status of the entity as offline in response to receiving the check-out message from a last-remaining, available agent representing the entity.

4. The method of claim 3, further comprising suspending transmission of the at least one message to any agent representing the entity while the status of the entity is offline.

5. The method of claim 1, further comprising determining whether the at least one message is received by the at least one available agent via the brokered chat service.

6. The method of claim 5, further comprising transmitting via the brokered chat service the inquiry message to the at least one available agent in response to determining that no message is received by the at least one available agent.

7. The method of claim 6, further comprising establishing the status of the entity as offline in response to failing to receive a response to the inquiry message.

8. The method of claim 7, further comprising suspending transmission of the at least one message in response to establishing the status of the entity as offline.

9. The method of claim 8, further comprising receiving the response to the inquiry message from the at least one available agent and updating the status of the entity as online as a result of receiving the response to the inquiry message.

10. The method of claim 1, further comprising displaying the status of the entity in the search results.

11. The method of claim 1, wherein ranking of the entity in the search results is further based on responsiveness of the entity.

12. The method of claim 11, wherein the responsiveness of the entity is based on a response time of the entity to messages transmitted to the at least one available agent via the brokered chat service.

13. The method of claim 1, wherein ranking of the entity in the search results is further based on a number of instances of successful communications with the entity in prior attempts to communicate with the entity via the brokered chat service.

14. The method of claim 1, wherein ranking of the entity in the search results is further based on a number of instances of unsuccessful communications with the entity in prior attempts to communicate with the entity via the brokered chat service.

15. The method of claim 1, wherein ranking of the entity in the search results is further based on a number repeat instances of communications with the entity via the brokered chat service.

16. The method of claim 1, further comprising displaying a responsiveness ranking of the entity in the search results along with the entity.

17. A brokered chat system comprising:
    a receiving gateway configured to receive at least one message from a first user via a first device, the first user included in a plurality of users;
    a transmitting gateway configured to transmit the at least one message from the first user to a second user via a second device, the second user included in a plurality of agents representing an entity, the first device and the second device included in a plurality of devices;
    a computer processor coupled to the transmitting and receiving gateways, and configured to perform a method including:
        establishing the status of the entity based on an availability of the plurality of the agents representing the entity, by establishing the status of the entity as online when at least one agent is established as available to represent the entity, and establishing the status of the entity as offline when no agent is available to represent the entity;

transmitting the at least one message to the at least one available agent while the status of the entity is online;

responsive to not receiving a response to the at least one message from any of the at least one available agent within a predetermined time period, sending an inquiry message to the at least one available agent, the inquiry message being different from the at least one message and the inquiry message inquiring of the at least one available agent about whether to maintain presence status associated with the entity;

updating the status of the entity in the brokered chat system based on a response to the inquiry message;

receiving a search request for the entity; and ranking the entity in search results based on the status of the entity in the brokered chat service.

18. The system of claim 17, wherein the computer processor is further configured to receive a check-out message from the at least one available agent via at least one device of the plurality of devices corresponding to the at least one available agent.

19. The system of claim 18, wherein the computer processor is further configured to establish the status of the entity as offline in response to receiving the check-out message from a last-remaining, available agent representing the entity.

20. The system of claim 19, wherein the transmitting gateway is further configured to suspend transmission of the at least one message to the plurality of agents representing the entity.

21. The system of claim 18, wherein the computer processor is further configured to:
determine first protocol information for the first device and second protocol information for the second device; and
configure the at least one message from the first device based on the second protocol information for the second device.

22. The system of claim 17, wherein the computer processor is further configured to determine whether the at least one message is received by the at least one available agent.

23. The system of claim 22, wherein the computer processor is further configured to transmit via the transmitting gateway the inquiry message to the at least one available agent in response to determining that no message is received by the at least one available agent.

24. The system of claim 23, wherein the computer processor is further configured to establish the status of the entity as offline in response to failing to receive a response to the inquiry message.

25. The system of claim 24, wherein the computer processor is further configured to suspend transmission of the at least one message in response to establishing the status of the entity as offline.

26. The system of claim 25, wherein the receiving gateway is further configured to receive a response to the inquiry message from the at least one available agent and the computer processor is further configured to update the status of the entity as online as a result of receiving the response to the inquiry message.

27. A non-transitory computer-readable storage medium storing instruction that, when executed by a processor, cause the processor to perform the operation method of claim 1.

28. A method for determining status for first user in a brokered chat service, the method comprising acts of:
receiving, via the brokered chat service, a check-in message from the first user;

establishing the status of the first user as available in the brokered chat service responsive to receiving the check-in message;

transmitting at least one message from a second user in the brokered chat service to the first user via the brokered chat service while the status of the first user is available;

responsive to not receiving a response to the at least one message from the first user within a first predetermined time period, sending an inquiry message to the first user to determine a continued presence of the first user in the brokered chat service, the inquiry message being different from the at least one message and the inquiry message inquiring of the first user about whether to maintain presence in the brokered chat service;

establishing the status of the first user as absent from the brokered chat service in response to receiving a negative response to the inquiry message or not receiving any response to the inquiry message within a second predetermined time period; and;

suspending transmission of another message from the second user to the first user while the status of the first user is absent, wherein communications via the brokered chat service are based on short-lived network sockets.

* * * * *